(12) United States Patent
Hollenberg et al.

(10) Patent No.: US 9,781,270 B2
(45) Date of Patent: Oct. 3, 2017

(54) SYSTEM AND METHOD FOR CASE-BASED ROUTING FOR A CONTACT

(71) Applicant: Genesys Telecommunications Laboratories, Inc., Daly City, CA (US)

(72) Inventors: Todd Hollenberg, Lafayette, CA (US); Bradley Krug, Colorado Springs, CO (US); Herbert Willi Artur Ristock, Walnut Creek, CA (US); Charlotte Toerck, Richardson, TX (US); Nikolay Korolev, Concord, CA (US); David H. Anderson, Durham, NC (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/450,190

(22) Filed: Aug. 1, 2014

(65) Prior Publication Data
US 2016/0036981 A1    Feb. 4, 2016

(51) Int. Cl.
*H04M 5/00* (2006.01)
*H04M 3/523* (2006.01)
*H04M 3/51* (2006.01)

(52) U.S. Cl.
CPC ........ *H04M 3/5233* (2013.01); *H04M 3/5166* (2013.01); *H04M 2203/402* (2013.01)

(58) Field of Classification Search
CPC ............. H04M 3/5232; H04M 3/5233; H04M 2203/402
USPC ....... 379/265.01–265.14, 266.01–266.1, 309
See application file for complete search history.

(56) References Cited

U.S. PATENT DOCUMENTS

| | | | | |
|---|---|---|---|---|
| 5,825,869 A | * | 10/1998 | Brooks ............... | H04M 3/5233 379/265.12 |
| 6,408,066 B1 | * | 6/2002 | Andruska ........... | H04M 3/5233 379/265.12 |
| 7,049,295 B2 | | 5/2006 | Harris et al. | |
| 7,136,448 B1 | * | 11/2006 | Venkataperumal . | H04M 3/5166 379/265.02 |
| 7,936,867 B1 | * | 5/2011 | Hill ..................... | H04M 3/5233 379/265.09 |

(Continued)

FOREIGN PATENT DOCUMENTS

KR    1020050010099 A    1/2005

OTHER PUBLICATIONS

International Search Report and Written Opinion for International Application No. PCT/US2015/043007, mailed Dec. 30, 2015, 16 pages.

(Continued)

*Primary Examiner* — William Deane, Jr.
(74) *Attorney, Agent, or Firm* — Lewis Roca Rothgerber Christie LLP

(57) ABSTRACT

A system and method for case-based routing as opposed to atomic interaction routing. A processor opens a case in a customer database. The case is associated with a workflow that has steps anticipated to be executed for the case. The processor identifies first and second steps of the workflow, and further identifies an agent with skills for handling the first and second steps. The processor generates a task for handling at least the first step of the workflow, and transmits instructions to route the task to the identified agent.

20 Claims, 13 Drawing Sheets

(56) References Cited

U.S. PATENT DOCUMENTS

| | | | |
|---|---|---|---|
| 7,996,329 B1* | 8/2011 | Schierholt | G06Q 10/06 700/99 |
| 8,126,133 B1* | 2/2012 | Everingham | G06Q 10/0631 379/265.01 |
| 8,311,863 B1 | 11/2012 | Kemp | |
| 8,600,019 B1* | 12/2013 | Cooper | H04M 3/4936 379/118 |
| 8,615,473 B2 | 12/2013 | Spiegel et al. | |
| 8,688,557 B2* | 4/2014 | Rose | G06Q 40/00 705/36 R |
| 8,737,600 B2* | 5/2014 | Kamlet | H04M 3/5233 379/265.11 |
| 8,838,788 B2* | 9/2014 | Pearce | G06Q 30/00 709/224 |
| 2002/0069101 A1* | 6/2002 | Vincent | G06Q 30/02 705/14.53 |
| 2003/0233374 A1* | 12/2003 | Spinola | G06Q 10/02 |
| 2004/0098274 A1 | 5/2004 | Dezonno et al. | |
| 2004/0264677 A1 | 12/2004 | Horvitz et al. | |
| 2006/0221941 A1* | 10/2006 | Kishinsky | H04M 3/523 370/352 |
| 2007/0004156 A1 | 1/2007 | Rouse et al. | |
| 2008/0152122 A1* | 6/2008 | Idan | H04M 3/5175 379/265.07 |
| 2009/0190744 A1* | 7/2009 | Xie | H04M 3/5232 379/265.11 |
| 2009/0204897 A1* | 8/2009 | Sogge | G06Q 10/06 715/700 |
| 2009/0307162 A1* | 12/2009 | Bui | G06N 5/022 706/12 |
| 2011/0150206 A1 | 6/2011 | Pickford | |
| 2012/0321072 A1* | 12/2012 | Dooley | H04M 3/5233 379/265.12 |
| 2013/0226657 A1* | 8/2013 | Bohe | G06Q 30/0201 705/7.29 |
| 2014/0081687 A1* | 3/2014 | Flockhart | G06Q 10/06 705/7.13 |
| 2014/0140494 A1 | 5/2014 | Zhakov | |
| 2014/0278884 A1* | 9/2014 | Schuler | G06Q 40/06 705/14.27 |
| 2015/0264180 A1* | 9/2015 | Wolthuis | H04M 3/5233 379/265.12 |
| 2016/0036982 A1 | 2/2016 | Ristock et al. | |
| 2016/0036983 A1 | 2/2016 | Korolev et al. | |

OTHER PUBLICATIONS

Jeremy Condit, et al., "Better I/O Through Byte-Addressable, Persistent Memory", SOSP'09, Oct. 11-14, 2009, Big Sky, Montana, USA., Copyright 2009 ACM, 14 pages.

European Search Report for Application No. 15826965.4, dated Apr. 11, 2017, 7 pages.

* cited by examiner

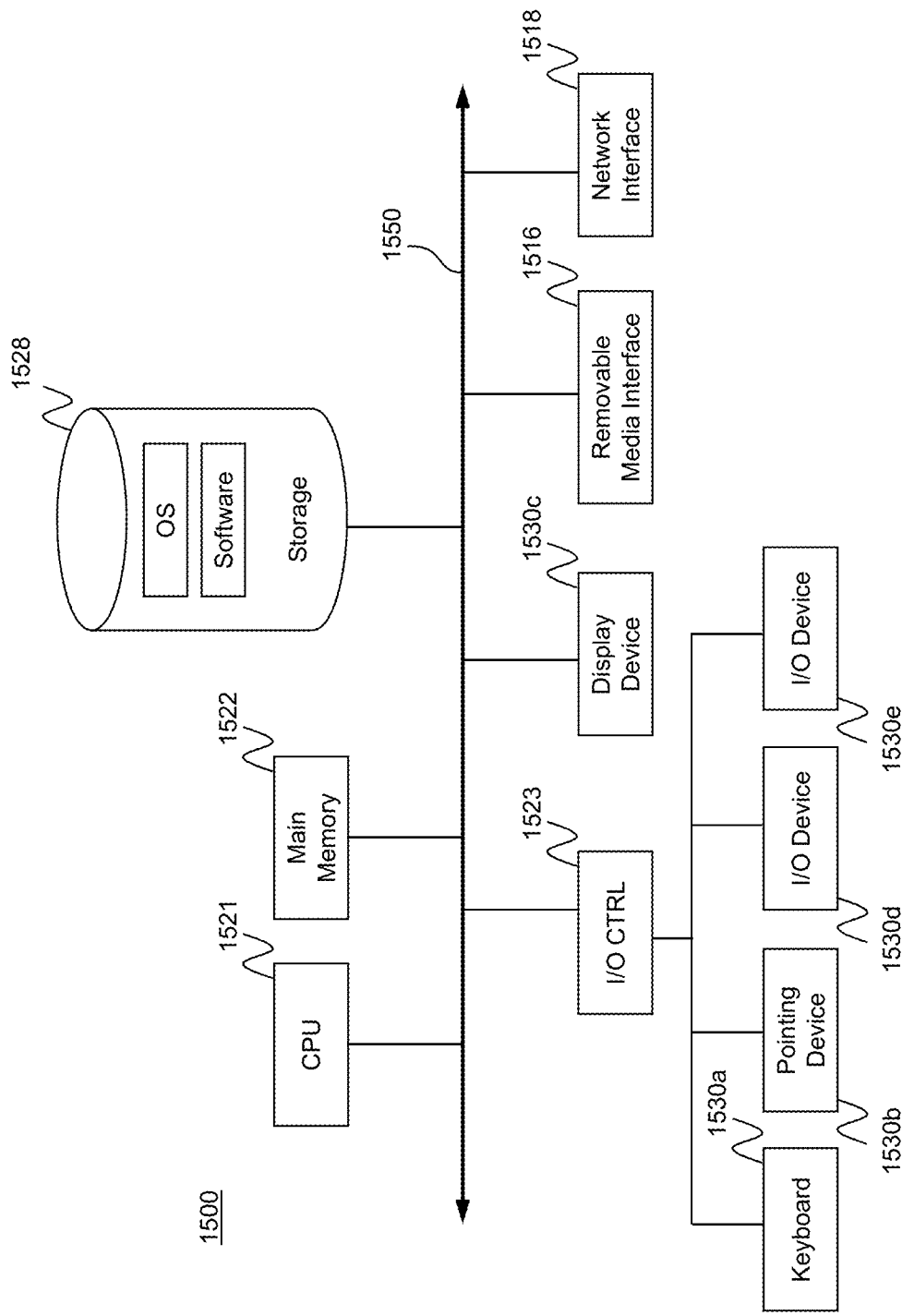

SYSTEM AND METHOD FOR CASE-BASED ROUTING FOR A CONTACT

CROSS-REFERENCE TO RELATED APPLICATIONS

This application is related to "SYSTEM AND METHOD FOR ANTICIPATORY DYNAMIC CUSTOMER SEGMENTATION FOR A CONTACT CENTER" and "ADAPTABLE BUSINESS OBJECTIVE ROUTING FOR A CONTACT CENTER", both filed on even date herewith, the contents of both of which are incorporated herein by reference.

BACKGROUND

A customer-centric organization needs to seamlessly integrate its operations with its customer intelligence to ensure a complete and actionable 360-degree view of the customer. Every interaction is generally treated as an opportunity to improve the customer experience through superior service, resulting in higher satisfaction, loyalty, and retention. Done correctly, these lead to increased success in both profit-based and non-profit-based businesses and services.

To this end, it is known in the art to provide a cloud-based, premise-based or hybrid (cloud-premise) customer interaction management platform that handles various types of inbound and outbound interactions (e.g., traditional voice, voice-over-IP, email, web chat/IM, SMS/MMS, video, fax, self-service other work items, etc.) to various types of resources (e.g., a contact center agents, a back office, an expert/knowledge worker, a branch office, a self-service operation, an outsourced operation, etc.). Customers may interact through the platform with different types of individuals (e.g., contact center agents, knowledge workers, back-office workers, etc.) and across multiple channels (e.g., contact center/IVR, proactive engagements, web, social media, mobile, etc.).

In one embodiment, a customer interaction management platform integrates a contact center, agent stations, and, optionally, a customer relation management (CRM) server. Typically, the contact center, the agent station(s), and the customer relation management server are coupled over one or more networks, which may be the Internet, a private network, or a telephone network. The customer relation management server may be physically located within the contact center and maintained by a third party, or located remote from the contact center and still operated thereby. End user interactions that call for management are routed, e.g., from the CRM server, for handling by the contact center agents. In one representative operating scenario, the contact center implements and maintains an object-based agent status model that contains such data as agent identification, workflow assignments, media capability descriptions, and status elements related to communication and media elements. The elements of this agent state model are dynamic and updated in real-time as an agent proceeds to receive or initiate interactions and to communicate with the end user using one or more multimedia applications.

Routing of interactions traditionally involves sending control signaling (as opposed to the media portion of the interaction itself, which typically does not get routed) to one or more agent queues. There may be queues associated with particular types of interactions, and there may be dedicated queues associated with skills or other characteristics of the agents. Typically, routing logic assigns interactions to agents based on configured logic, such as longest-idle agent, least occupied agent, skill level, etc. In an alternative scenario, an interaction is routed to an agent queue, where it is picked up by an available agent associated therewith and who has the appropriate skill level and availability to provide the needed communication with the customer. A hybrid approach may be implemented wherein an agent has associated therewith a personal workbin into which deferrable interactions (e.g., email or other tasks such as answering a customer letter, proactively contacting a customer, etc.) may be placed; in such a mode, the agent typically has some freedom to decide which of his or her tasks to do next. Agents use workbins to store interactions that they have started working on and wish to continue working on at a later time. Interactions can also be distributed to workbins by a routing server. A workbin is like a queue in that it holds interactions, although a workbin typically is associated with a particular agent. A shared group workbin may be used by multiple agents in a group or place. Agents can view the contents of the workbin and pull interactions from it in any order. Thus, in a scenario in which agents have flexibility in selecting interactions, typically the agent can view some details (e.g., statistics such as number of interactions in queue, or average wait time, or service level, etc.) about a queue containing all of the interactions they are assigned to handle. Processing of interactions in queue usually is automated, although an agent may have an opportunity to interact with the identified or viewable interactions. In the latter case, and when given a choice (possibly constrained by service level or other policies), an agent may elect to pick the interactions that are most easy to resolve, or the contacts with which he or she is most familiar. Typically, an agent is trained for certain activities/tasks, some of which the agent may be scheduled to handle based, for example, on a designated "skill" attribute that may be enabled or disabled at a given point in time. Further, as a particular customer interaction proceeds, the customer may be handed off from one agent to another, either as dictated by business process workflow, because a first agent is unable to address the customer's need, or for other reasons. Although agent switching is sometimes required, it is desirable to avoid or reduce the impact of a context switch, especially if a given agent is aware of a prior contact history and can also handle anticipated follow-up steps.

In a traditional interaction, the contact center agent assignment logic preferably routes an inbound interaction to what the system determines is a "best" or target agent. The agent typically is selected or defined based on one or more criteria, such as availability, occupancy, static customer segment, priority, required skills to handle an interaction of a given media type, agent capacity, customer interaction history (e.g., last agent routing), and other criteria, such as up- or cross-sell opportunities, agent skills, and the like.

While these techniques work well, it is desirable to provide enhanced contact center routing strategies.

SUMMARY

Embodiments of the present invention are directed to a system and method for case-based routing in a contact center. A processor opens a case in a customer database. The case is associated with a workflow that has steps anticipated to be executed for the case. The processor identifies first and second steps of the workflow, and further identifies an agent with skills for handling the first and second steps. The processor generates a task for handling at least the first step of the workflow, and transmits instructions to route the task to the identified agent.

According to one embodiment, the case is a record including a history of interactions occurring in the case.

According to one embodiment, the case is associated with a case ID, and the instructions to route the task include the case ID.

According to one embodiment, the processor retrieves a history of interactions associated with the case based on the case ID, and displays the history of interactions on an agent device for the identified agent.

According to one embodiment, the processor generates a second task for handling the second step of the workflow, and transmits instructions to route the second task to the identified agent.

According to one embodiment, the processor monitors for a trigger event, where the generating of the task is based on detecting occurrence of the trigger event.

According to one embodiment, the trigger event is lapse of a set time period between two workflow steps.

According to one embodiment, the trigger event is a preset date.

According to one embodiment, the processor retrieves identification of a first customer segment to which a customer associated with the case belongs. The first customer segment is associated with a first objective of the contact center. The processor predicts an outcome of handling the task by the agent according to the first customer segment. The processor also identifies a second customer segment based on the predicted outcome, and re-associates the customer to the second customer segment. According to one embodiment, the second customer segment is associated with a second objective of the contact center different from the first objective. The task is then handled according to the second objective instead of the first objective.

According to one embodiment, the processor identifies first and second objectives of a contact center, where the first objective is identified as more important to the contact center than the second objective. The processor determines that the agent has skills for achieving the first objective, and determines a likelihood of success of the first agent in achieving the first objective. The processor also identifies a second agent for handling the second objective, where the second agent also has skills for handling the first and second steps of the workflow associated with the case. The processor determines a likelihood of success of the second agent in achieving the second objective, where the likelihood of success in achieving the second objective by the second agent is higher than the likelihood of success of achieving the first objective by the agent. The processor transmits instructions to route the task to the second agent, and prompts the second agent to pursue the second objective.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 11A is a block diagram of a computing device according to an embodiment of the present invention;

DETAILED DESCRIPTION

Figure 1:
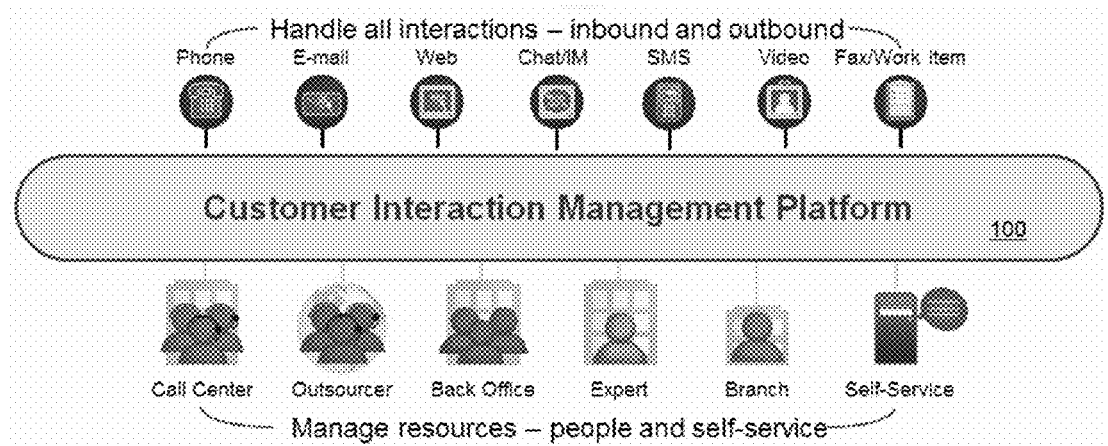
FIG. 1 is a block diagram of a customer interaction management platform in which the techniques described herein may be practiced.

In general terms, embodiments of the present invention are directed to a customer interaction management platform that uses a set of one or more interaction routing strategies to determine which agents should receive and handle particular contacts. The platform includes an agent assignment mechanism, which is augmented to implement one or more of a set of routing schemes. A first routing scheme proactively adjusts a customer service level against which the agent assignment mechanism is executed. A second routing scheme operates during a given interaction using the agent assignment mechanism to automatically adjust which of a set of business objectives should be addressed by an available agent. A third routing scheme provides the agent assignment mechanism one or more parameters associated with a case to facilitate the assignment. These routing strategies may be carried out in whole or in part concurrently or sequentially.

The one or more routing strategies may include a "dynamic customer segmentation" strategy that provides an assessment or a-priori re-assessment of a customer's existing customer segmentation (e.g., gold, silver, bronze, etc.) and then determines, based on this analysis and an anticipated outcome of processing a given customer interaction, whether the customer's customer segment association (for new interactions) should be promoted or demoted. If, for example, this anticipated outcome would promote the customer to a next higher segment, then the current interaction may be treated in accordance with the policies of this higher-level segment. The promotion or demotion of the customer segment association may be context-dependent and carried out on a per interaction basis or over some time period for multiple interactions.

Another routing strategy implements an "adaptive business objective" strategy by which agent assignments are based in part on adjusting a business objective (BO) during the agent assignment process instead of relying upon a fixed or static business objective that is predefined or configured. In this approach, the business objective is composed of two elements: a reason for interaction (as potentially refined through an IVR dialog), and a set of business opportunities (e.g., cross-/up-sell offers) that vary based on a known customer profile. Given these factors, a set of business objectives are then defined for the customer. During the agent selection process, the routing logic seeks to find a best matching agent for addressing both elements and begins with a first (best) business objective. If no such agent can be found, a next best BO is used, and so on until an appropriate agent is found to handle the interaction according to the (potentially-adjusted) BO. The BO-agent pairs are then ranked based on probability of success of the particular agent in handling the particular BO. According to one embodiment, an agent with the highest rank is selected and the interaction routed to that agent for handling the associated BO.

Yet another routing strategy implements a "case routing" strategy determined at least in part on a "case record" associated with an interaction, such as (but not limited to) a CRM-sourced interaction. A CRM system or server, or any other customer database system (collectively referred to as CRM system), which may a component of the contact center or associated therewith, models a customer support interaction (between one of its customers and the system) as a "case." A case (or "ticket") has an associated case record having given information identifying the case, its type, an anticipated workflow (through a set of defined or ordered steps) to potential resolution, anticipated timing, escalation paths, and the like. Depending on the CRM system from which the case originates, a case may be associated with a particular template depending on the nature of the customer support issue. In case routing, a case record associated with a case is used to influence which agent in a set of agents in a contact center should be identified to work the case. Without limitation, a best or target agent is selected based on one or more factors, such as an identity of a particular next interaction or step in the processing of the case (as defined by the case workflow), one or more anticipated future interactions for the given case (e.g., based on predefined steps according to a workflow, and/or dynamic adjustments according to an anticipated outcome of a particular step, etc.) and that should preferably be handled by a same agent, the existence of one or more previously-performed interactions for the case, including whether any such interactions have been re-opened, remaining completion time for the case, and the like.

According to a feature of this disclosure, the above-described routing techniques may be used either alone or together. Thus, in one embodiment, the dynamic customer segmentation strategy is implemented in association with the adaptive business objective strategy or with case routing. In another embodiment, the adaptive business objective strategy is implemented in association with case routing. Yet another alternative is to associate (combine) all three of the above-described strategies. These routing strategies may be carried out in whole or in part concurrently (synchronously) or sequentially (asynchronously).

FIG. 1 illustrates a customer interaction management platform 100 that may be cloud-based, premises-based, or a hybrid implementation. The platform may be operated by a dedicated service provider, but this is not a requirement. In general, the platform 100 handles all types of interactions, whether inbound or outbound. As illustrated, these interactions include, without limitation, voice, e-mail, web, chat/IM, SMS, video, fax/work items, and others. Interactions are directed to various resources such as a call center, outsourcer, back office, an expert (knowledge worker), a branch office, a self-service function, or the like. Preferably, the platform implements a framework that comprises a set of operational layers, such as a configuration layer that provides for configuration, data integrity control, access control and runtime notifications, a management layer that allows a customer to monitor the behavior and status of applications executing in the platform (e.g., solution control, alarm processing, troubleshooting and fault management), a media layer that provides external interfaces, enables switch-independence for the applications, and provides for data distribution, and a services layer that provides status and statistics.

Figure 2:
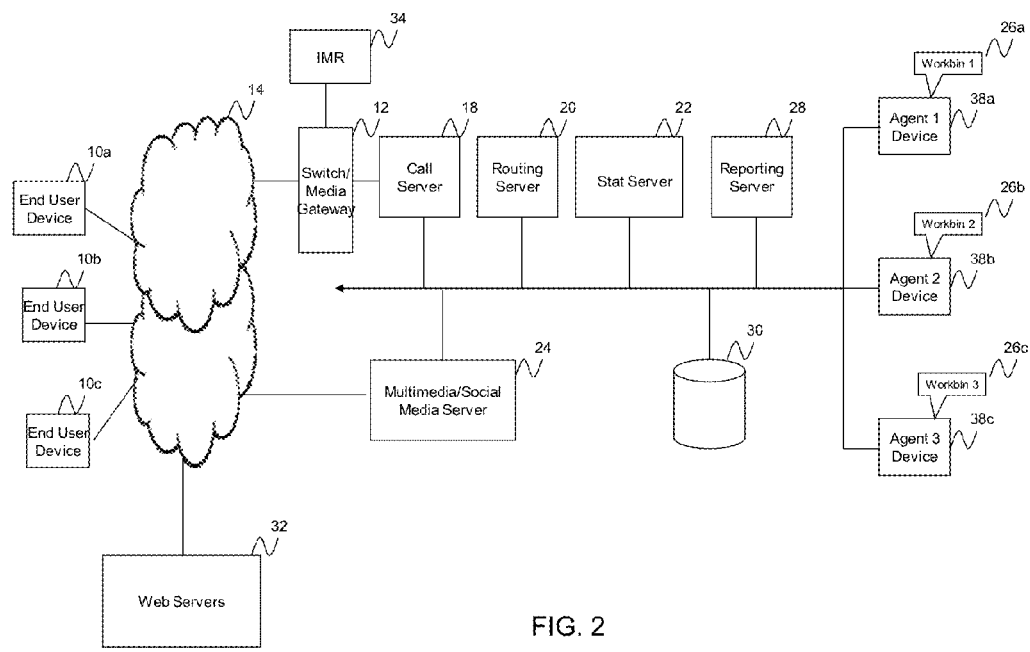
FIG. 2 is a block diagram of a contact center system according to one embodiment of the invention.

FIG. 2 is a schematic block diagram of a system for supporting a contact center in providing contact center services according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling components of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, co-browsing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's response may then be used by the routing server 20 to route the call to an appropriate contact center resource.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The routing server 20 may query the customer information from the customer database via an ANI or any other information collected by the IMR 34 and forwarded to the routing server by the call server 18.

Once an appropriate agent is available to handle a call, a connection is made between the caller and the agent device 38a-38c (collectively referenced as 38) of the identified agent. Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The selection of an appropriate agent for routing an inbound call may be based, for example, on a routing strategy employed by the routing server 20, and further based on information about agent availability, skills, and other routing parameters provided, for example, by a statistics server 22.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 3:
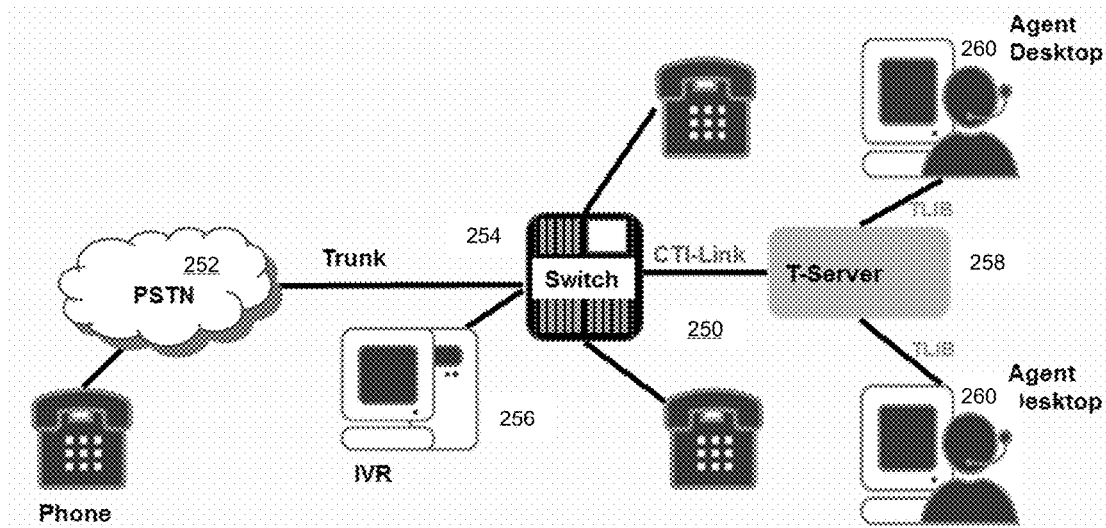
FIG. 3 is a block diagram of a telephony-based computing infrastructure, such as a contact center, in which the techniques described herein may be practiced.

FIG. 3 illustrates a traditional customer interaction management platform 250 that interoperates with telephony infrastructure, such as PSTN 252, according to another embodiment of the invention. In this embodiment, the platform 250 comprises switch 254, IVR 256, a telephony server 258, and a set of agent desktops 260.

Figure 4:
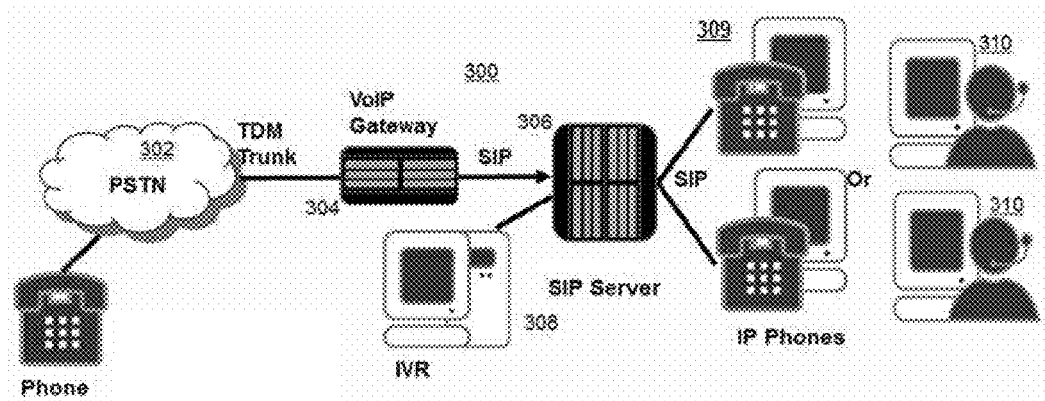
FIG. 4 is a block diagram of an alternative SIP-based environment in which the customer interaction management platform is used.

FIG. 4 illustrates a Voice-over-IP embodiment wherein the customer interaction management platform 300 interoperates with the PSTN 302 and a VoIP gateway 304, and comprises SIP server 306, IVR 308, and IP-based hard phones 309, or IP-based soft phones 310, according to one embodiment of the invention.

Although not shown, typically the customer interaction management platform includes native support for all types of standard media, such as voice (TDM/VoIP), email, chat, co-browse, web forms, and others.

Figure 5:
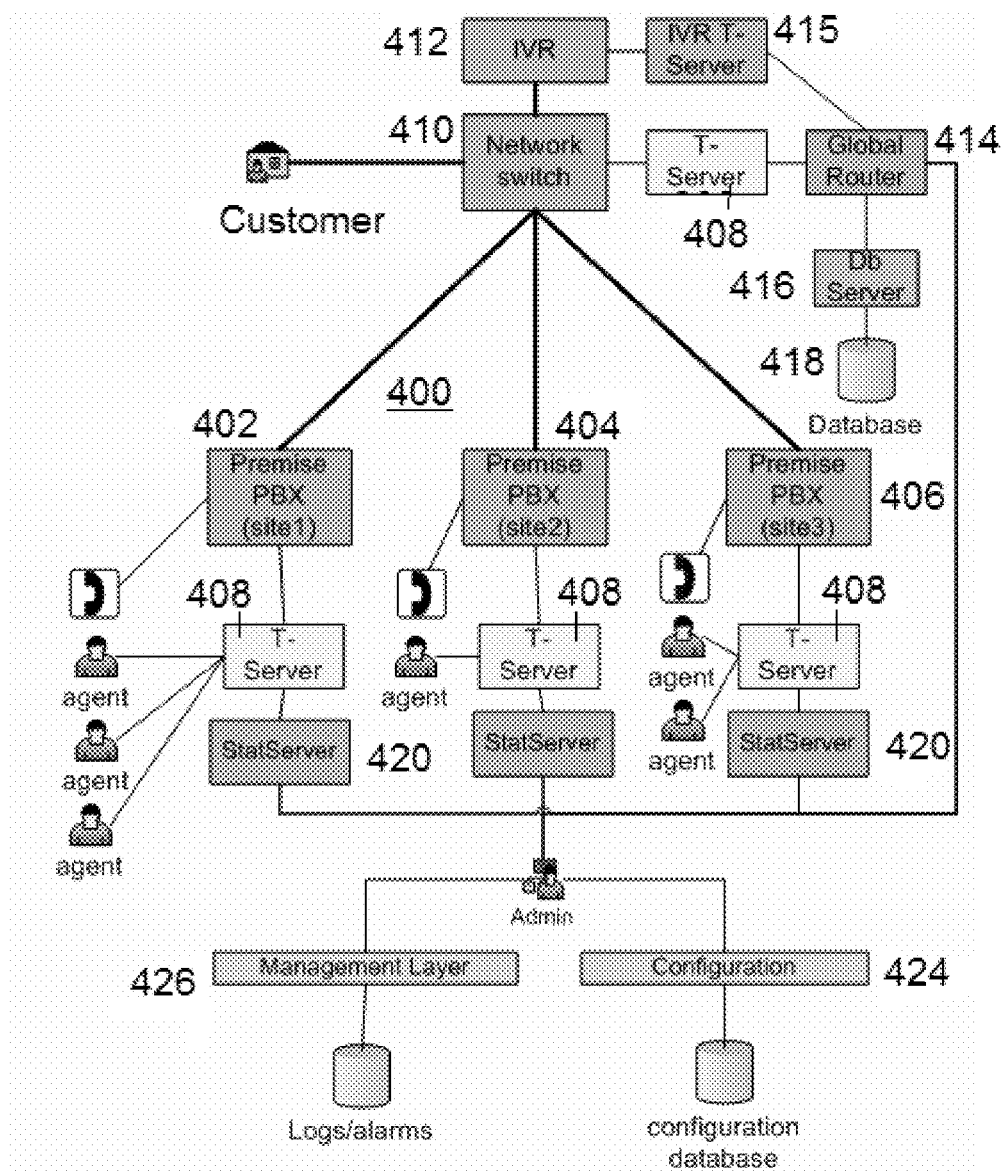
FIG. 5 is a detailed block diagram of a hybrid (premises-cloud) environment in which the techniques of this disclosure may be practiced in one embodiment.

FIG. 5 illustrates hybrid on-premises and cloud-based implementation of the customer interaction management platform. In this embodiment, there are three (3) premises locations 402, 404 and 406, and each of these locations is associated with a control server 408 to which agents associated with the platform can connect. Customers interface to the platform via a network switch 410. A control server 408 is associated with the network switch and interfaces to a global router 414 that executes a routing strategy for interaction routing. A database server 416 provides an interface to one or more databases 418. An interactive voice response (IVR) unit 412 is associated with the network switch 410, and IVR may be controlled by its own control server 415. A central network routing element typically is located within router 414, which may then instruct the network switch (via server 408) to send the call to IVR; once the IVR has finished the call, it could either be terminated or transferred to an agent. However, it is also possible that the call is sent to the IVR unconditionally, in which case the IVR control server 415 decides whether to terminate it or transfer to an agent. The former scenario is sometimes referred to as IVR-behind switch, while the latter is referred to as IVR-in-front. Each control server 408 typically provides various control functions such as agent telephony state propagation, call control and monitoring, call model unification, inter-site session negotiation (e.g., call transfers, conferences, etc.) and provides for a common message bus for other applications. The routing engine in the global router 414 provides strategy-driven interaction flow control, which are referred to herein as routing strategies. Each premise may have associated therewith a "state" server 420 that provides the platform global agent state/capacity data, and real-time metrics calculations. A configuration server 424 provides dynamic configuration management. A management layer 426 provides for application monitoring and control, centralized logging, alarms, and the like. Although this figure illustrates direct network level routing to agents, this is not a requirement as there may be multi-step routing (e.g., from network to site, and at the site level to agents through a site level router).

Figure 6:
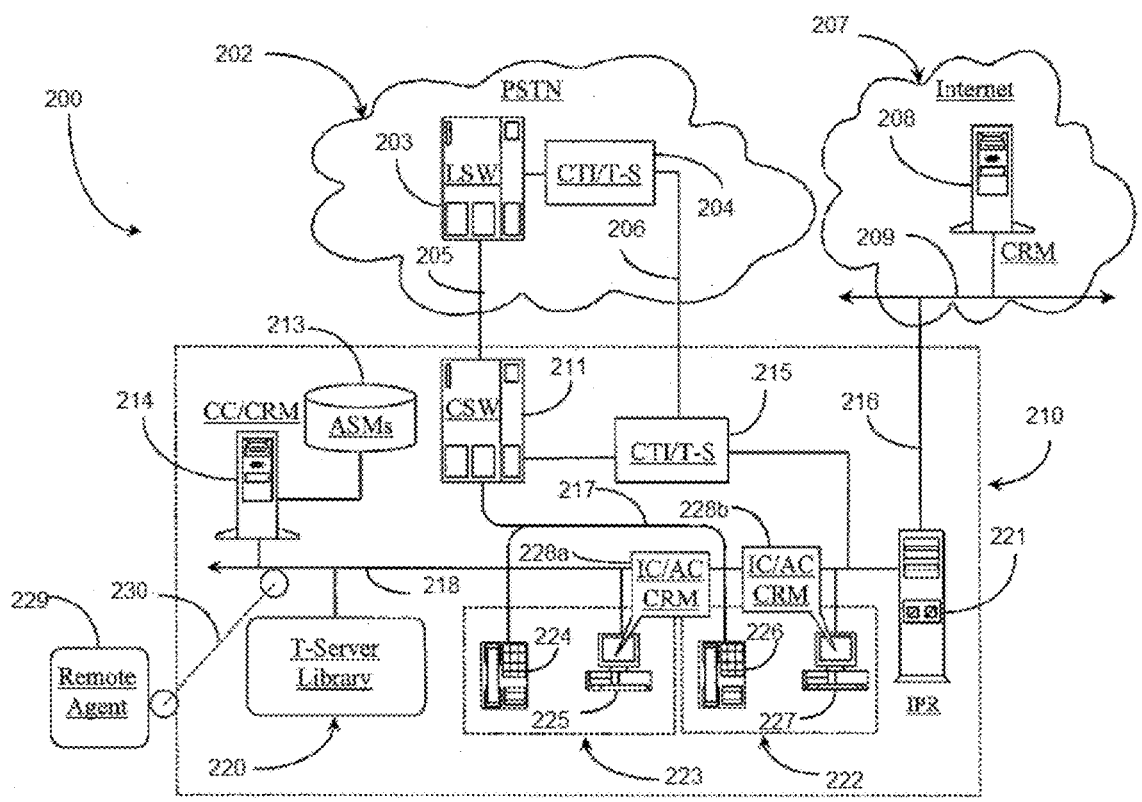
FIG. 6 is detailed block diagram of another hybrid cloud-based communications system in which the disclosed techniques may be implemented.

FIG. 6 is a more detailed architectural overview of a communications environment in which the techniques of this disclosure may be practiced. In this embodiment, a system is provided that integrates a contact center, an agent station, and a customer relation management (CRM) server. This is just a representative environment and should not be taken as limiting. In this embodiment, communications environment 200 includes a public-switched-telephone-network (PSTN) 202, an Internet network 207, and a communications or contact center 210. PSTN network 202 may be another type or configuration of telephone network. For example, network 202 may be a wireless network or a combination of wireless and wired networks. Likewise, network 202 may be a private or public telephone network. If the network is the public PSTN network, it may include a switch 203 which may function as a service control point (SCP). If the network is a private network, it may include a local telephone switch (LSW) 203 for receiving and routing telephone calls in the network. The LSW 203 may be an automated call distributor (ACD), a private branch exchange (PBX) or some other call switching hardware, which may also function as a service control point (SCP). In this example, LSW 203 has connection to communication center 210 by way of a telephony trunk 205. Also, in this example, LSW 203 is enhanced with a computer-telephony-integration (CTI) processor 204 running an instance of a telephony server (T-S). Processor 204 provides intelligent telephony and interaction capabilities to LSW 203. Examples include intelligent peripherals live interactive voice response systems, and other like capabilities. The instance of the telephony server T-S running on processor 204 provides an array of intelligent routing services, which may be integrated with CTI and intelligent peripheral functions.

Communication center 210 has a switch (CSW) 211 (such as a PBX or ACD) provided therein and adapted to receive incoming telephone calls from PSTN 202 for the purpose of internal routing to communication center personnel and automated help or service systems. CSW 211 is, of course, also adapted for outbound calling. CSW 211 may be a PBX or other type of telephone switch as mentioned above with reference to LSW 203. CSW 211 is connected to LSW by telephone trunk 205. CSW 211, like LSW 203, is also connected to a CTI processor 215 running an instance of the T-S server.

Processor 215 preferably uses a separate data network 206 for communicating with processor 204. In this way, intelligent routing routines may be created and implemented at the PSTN level thereby enabling performance of internal call routing at the network level. Data solicited from a caller may be transferred into center 210 ahead of the actual telephone call with the use of network 206 and the connected CTI processors and T-S instances. Agent level routing may then be performed at network level and may be controlled by center 210.

Center 210 preferably has a local-area-network (LAN) 218 provided therein and utilized to connect multiple workstations and systems together for communication. In this example, an agent workstation 522 and an agent workstation 523 are illustrated having LAN connectivity. Workstation 522 contains typical agent equipment for communication not limiting to a personal LAN-connected computer 227 with a video display unit (VDU) such as a computer monitor and an agent telephone 226. Telephone 226 has connectivity to CSW 211 via internal telephone wiring 217. Workstation 523 is adapted for communication in a like, but not necessarily identical, manner as is station 522 by way of a LAN-connected computer 225 and by way of an agent telephone 224. Additional communication equipment types may be represented within stations 523 and 522; these include, without limitation, fax machines, automated answer systems, other processing terminals, and other such network-capable equipment types. An agent may be a home agent (a person that works from his or her home) and connects to the contact center, e.g., via voice-over-IP connections. In one embodiment, telephones 224 and 226 may be data phones connected to respective computer hosts as terminal machines. There are many configuration possibilities as well as equipment variances possible.

CTI processor 215 preferably has a LAN connection to enable supervisors with administrative authority to modify or create new routing routines and so on. The function of T-S within processors 215 and 204 depends on accessibility to a telephony server library (T-Server Library) 220, which in this example, is connected to LAN 218. Library 550 preferably contains all of the objects, descriptors, and constructs to enable integrated CTI/Transaction Intelligent call processing. Typically, the library is an embedded part of a server that uses the library for communication with other network elements.

Without limitation, Internet network 207 is part of communications environment 200. Internet 207 may be another type of wide-area-network (WAN). For example, network 207 may be a corporate or private WAN or metro-area-network (MAN). Internet network 207 has a network backbone 209 extending there through that represents all or some of the equipment, lines and access points that make up an Internet network as a whole, including any connected sub-networks. As noted above, no geographic or logical limitations are intended.

A customer relations management (CRM) server 208 is provided or otherwise illustrated within Internet network 207 and is adapted to manage customer relations relative to one or more customer bases related to one or more enterprises such as one hosting communication center 210 for example. CRM system or service 208 may be provided by a third party enterprise. A third-party CRM solution may be implemented from the base of a third-party enterprise that may include third party customer management services. Likewise, CRM server 208 may be part of customer premise equipment (CPE) solution, whereby the entire or certain portions of a customer base are related to the host enterprise and serviced internally at a specific communication center, such as center 210. In the latter case, CRM server 208 may be hosted within the physical domain of center 210 and connected to LAN 218. In still another embodiment, CRM system 208 may be adapted to service a customer base related to a plurality of regionally distributed contact or communication centers of a same enterprise. In this case, a separate but centralized facility may be provided within the domain of Internet 207 whereby those customers of multiple centers may be managed according to the policies and rules established at each center.

In this example, center 210 is a multimedia-capable communication center with Internet connectivity for contact and interaction with customers and business entities. An Internet protocol router (IPR) 221 is provided within center 210 and has connection to LAN 218. IPR 221 is adapted to receive multimedia and communication events from Internet 207 and to route such events to agent stations like stations 222 or 223 over LAN 218. Multimedia events may include email events, Web form interactions, voice over IP interactions, Web messaging interactions, multimedia-capable, or text chat sessions, video mail interactions, network conferencing sessions, and IP telephony sessions. Therefore, organized channels (media channels) and routing systems may be in place for handling these types of network interactions or events. In another embodiment, the CRM system does not directly address agents (endpoints), but instead connects to a service provider's media services (e.g., Genesys® T-Server™ for voice, Genesys® Interaction Server™ for multimedia) through a CRM adapter. Likewise, one or more Internet servers (not illustrated) may be provided to host certain network interaction like chat or Web-meetings. Such server may be assumed present in this example and provided within the domain of Internet 207, which includes that of LAN 218 when connected online.

Among other services, CRM system 208 may be adapted to provide automated self-help services, Web-form services, email services, automated fax services, and other multimedia services. Likewise, back-end data from a CRM system may include history information; statistical information; further contact information; and links to other resources.

In this embodiment, a CC/CRM adaptor system 214 is provided within communication center 210 and is adapted to integrate CRM capabilities with agent and call-control/management capabilities at the level of an agent workstation or desktop. CC/CRM system adaptor 214 is adapted to provide integration between CRM system 208 and CTI-T-S capability (processor 215) using one or more dynamic agent state models 213. As noted above, the models 213 represent a collection of agent models representing individual agents and agent capabilities and work task assignments of those agents assigned to the domain of system 214, or in this case, agents that are available through contacting communication center 210.

Within system 214, preferably contact-center function and management is abstracted as well as CRM service function and management so that they may be simultaneously managed and monitored in a convenient agent user interface with graphic display capability at the agent level. CRM adaptor system 214 has a parent application (not illustrated) that communicates with client applications distributed to agent stations. An instance of interaction control/agent control (IC/AC) and CRM client interface 228a is provided within the domain of agent workstation 223 and is executable, e.g., as a software instance from the desktop of computer 223. A similar instance of IC/AC/CRM 228b is provided within the domain of station 223 and is executable, e.g., as a software instance from computer 557.

By executing and running instance IC/AC/CRM instance 228a, an agent operating at station 223 can receive voice and media events and at the same time provide CRM services to callers or interaction participants in a way that follows the agent status model of that particular agent. The agent status model for station 223 defines the agent, and preferably all (or at least some) of the communication capabilities of the agent including all of the CRM services available to customers of the agent and to the agent related to those customers. In addition, the model for an agent preferably includes dynamic call and session management including current agent state and presence over a plurality of media channels including live voice channels. Client instance 228a effectively bridges CRM and CTI-related services particular to agent model, customer definition, and event purpose using both manual and, in some cases automation to select or provide services and data needed to enhance the transactional experience for both the agent and caller.

An agent operating, for example, at station 223 may receive telephone voice call events from PSTN 202 by way of routing through CSW 211 and internal telephone wiring 217. The presence of these calls in the system is noted and recorded at CTI/T-S processor 215, which has connection to CC/CRM adaptor 214 over the LAN. In one embodiment, a direct data link (bridge) may be provided between CTI/T-S processor 215 and adaptor 214. CC/CRM adaptor 214 prompts CRM system 208 when a communication event relevant to agent station 223 is being routed.

During routing, the telephone call is routed to agent telephone 224 while data about the call is routed over LAN 218 to computer 225 and is displayed, often ahead of pickup of the telephone call. The earlier prompt or request made to CRM 208 by CTI/T-S processor 215 maybe an initial machine-to-machine request using hypertext transfer protocol/simple object access protocol (HTTP/SOAP) asking CRM 208 to be ready to send data about the caller to agent desktop 225 using HTTP protocols, in this case via a network-access path defined by access line 216 and LAN 218 and IPR 221, which routes the connection. CRM 108 may be in a state of monitor, or always connected to the main system wherein connections to agent desktops are automatic.

In a typical operating scenario, CRM 208 stands ready and waits for a request from the agent operating station 223. In this scenario, data about the call and caller may arrive at computer 225 before the call is picked up at telephone 224. The agent may then use IC/AC/CRM instance to send a request for specific services and/or data to be available at the desktop when the agent picks up the call. CTI telephony call transfer services and multi-party connecting may be leveraged, for example, as examples of CRM service solutions provided by CRM server 208. CRM server 208 may be prompted to deliver a solution implemented at CSW 211, like a multiparty-bridged connection or meeting wherein the agent initiates the connection and then drops out to take a next call.

In another embodiment, data network telephony (DNT) callers may contact center 210 using soft phones (IP-based) or Internet-capable cellular telephones, smartphones, tablets, or other such devices. In these scenarios, there may be more media channels available to the interaction like messaging, chat, email, and so on. In a pure DNT sense, IPR 221 may notify CC/CRM adaptor of an event for station 223 such as a videoconference using a host server (not illustrated). CRM also may set up the initial space and format for the conference for the agent and the agent may add specific contacts provided by CRM server 208, which may be visible in an interactive list on the agent's desktop interface. An agent may interact, and may bring in new media channels and capability to the instant interactions dynamically.

Preferably, the agent status models 213 are updated during activity periods and are rendered in a state of inactive or non-accessibility when the associated agent is not available for communication. When an agent comes online, his or her agent status model is activated and he is then ready for interaction. CC/CRM adaptor 114 and the agent instance of IC/AC/CRM 228a, for example, are both charged with reporting state data to appropriate destinations.

Agent stations 223 and 223 are not required to be located within a contact center. As illustrated, a remote agent may use his or her own telephone line and an Internet or prevailing WAN or MAN connection as long as his or her telephone calls are routed from CSW 211. A roaming agent 229 is illustrated in this example with a wireless connection to 230 LAN 218. Agent 229 may also practice the invention using his or her wireless access connection to LAN 218 and a cellular telephone. Again, preferably all telephone calls are routed through CSW 211 or a similar CTI-enhanced switch.

Adaptor 214 may be a soft adaptor running in CTI/T-S processor 215, or in IPR 221, or in some other connected host. Moreover, CRM system 208 may be provided as a third-party service or a CPE implement.

Typically, the contact center includes an agent interaction layer adapted to provide abstraction of communication center data and CTI data about any particular agent. The abstracted data is used to provide and to update agent status that is represented within CC/CRM adapter 214 in the form of an object model.

One or more functions of a technology platform such as described above may be implemented in a "cloud-based" architecture. Cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud-based platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

As noted above, the front-end of the above-described infrastructure is also representative of a conventional web site (e.g., a set of one or more pages formatted according to a markup language).

Client devices access service provider infrastructure as described to retrieve content, including HTML, media players, video content, and other objects. A typical client device is a personal computer, laptop, mobile device, tablet, or the like. A representative mobile device is an Apple iPad® or iPad5, iPad Mini, an Android™-based smartphone or tablet, a Windows®-based smartphone or tablet, or the like. A device of this type typically comprises a CPU (central processing unit), such as any Intel- or AMD- (or other) based chip, computer memory 304, such as RAM, and a flash drive. The device software includes an operating system (e.g., Apple iOS, Google® Android™, or the like), and generic support applications and utilities. The device may also include a graphics processing unit (GPU), and a touch-sensing device or interface configured to receive input from a user's touch. The touch-sensing device typically is a touch screen. The mobile device comprises suitable programming to facilitate gesture-based control, in a manner that is known in the art. The client is not limited to a mobile device, as it may be a conventional desktop, laptop or other Internet-accessible machine running a web browser (e.g., Internet Explorer, FireFox, Safari, Chrome or the like. Content retrieved to the client may be rendered in a browser, within a mobile app, or other rendering engine.

Enhanced Routing Techniques

In the context of a content center (or, more generally, a customer interaction management platform), routing refers generally to the process of sending an interaction to a target. A routing "strategy" instructs how to handle and where to direct interactions under different circumstances. In addition to selecting the target, the notion of routing may also include determining interaction characteristics such as type (voice, email, chat, etc.), priority, customer segment, service type, target SLA, etc.). Routing strategies may be created in a development environment, using a tool such as Genesys® Interaction Routing Designer (IRD), where users can test, modify, and load routing strategies. Genesys Universal Routing Server (URS) is a server that executes routing strategies so developed and, in particular, using routing strategy instructions. The techniques below may be implemented in or in association with contact center agent assignment logic. More generally, the contact center agent assignment mechanism may implement one or more various agent mechanisms including, without limitation, skills-based routing, business priority-based routing, share agent by service level-based routing, cost-based routing, and other known mechanisms. The contact center agent assignment mechanism may then be augmented to include one or more of the enhanced routing techniques that are described in this disclosure. A representative but, non-limiting platform that implements such agent assignment functions is Genesys® Orchestration Server (ORS). This server provides session-based routing and integrates this and other back-end contact center functions with other contact center systems, servers, programs and processes.

Any of the herein-described functions may be implemented within an enterprise environment, within a cloud-based environment, or within a hybrid (a combination of cloud and enterprise) environment.

The following sections describe the various routing (contact-to-agent assignment) methods or strategies that may be implemented to provide enhanced agent assignments (or, more generally, to augment such existing agent assignment mechanisms) according to this disclosure. As noted above, these routing methods are sometimes referred to herein as "dynamic customer segmentation," "adaptive business objective routing," and "case routing." This nomenclature is provided for descriptive purposes only and should not be deemed limiting. As one of ordinary skill will appreciate, two or more of the above-described routing techniques may be used with one another. Thus, in one embodiment, the dynamic customer segmentation strategy is implemented in association with the adaptive business objective strategy or with case routing. In another embodiment, the adaptive business objective strategy is implemented in association with case routing. Yet another embodiment is to associate (combine) all three of the above-described strategies. The routing strategies may be carried out in whole or in part, or concurrently or sequentially. More generally, two or more of these routing strategies may be implemented asynchronously with respect to one another, or synchronously with respect to one another. These may be configured or specified using a development/configuration tool such as described above.

Anticipatory Dynamic Customer Segmentation Routing

As is known, when a customer seeks to get in touch with a contact center, typically the contact center applies policies in accordance with a current customer segment (or association), such as Gold, Silver, Bronze, or the like (regardless of the manner in which the segments may be designated). According to one embodiment, the customer segment reflects the "value" of the customer to the company, where a higher ranking typically implies a preferred/enhanced level of care or service (a "service level"). In this regard, the customer segment identification may be deemed to be identification of a service level desired to be provided to customers belonging to the customer segment. For example, a Silver customer's call might be connected to an IVR system while a Gold customer's call might be directly connected to a live agent. Also, different business objectives may be identified for an interaction with a customer depending on the customer segment identification. Such business objectives may relate to customer satisfaction and/or business outcome. For example, the business objective for a silver customer may be to achieve a certain NPS score, and/or closing a deal on a particular business opportunity offered to silver customers. The business objective for a gold customer may be to achieve an even higher NPS score, and/or closing a deal on a business opportunity offered to gold customers.

Current customer segmentation in a contact center such as described above is relatively static, and it generally takes into account present and potential future customer value for the company. In existing systems, the customer's segment association, if it is evaluated at all, is generally reviewed (and potentially adjusted) after-the-fact; in particular, in accordance with the outcome of a given (past) interaction. According to such existing systems, any new segment association then becomes effective for a future interaction.

According to a dynamic customer segmentation scheme according to embodiments of the present invention, a customer's service level is potentially adjusted proactively, such as, for example, in advance of a particular new interaction (or set of new interactions), or in real-time during an interaction itself. According to one embodiment, a dynamic customer segmentation process is invoked in response to detecting a current interaction with the customer. The interaction may be an atomic interaction or an interaction related to a particular case. One or more static and/or dynamic factors may be taken into account in proactively adjusting the customer's service level. For example, one or more of the static and/or dynamic factors may be taken into account to advance (promote) a customer from a current segmentation status (e.g. as stored in a customer record), to some higher (e.g., a next higher) segmentation status.

According to one embodiment, an anticipated outcome of a pending interaction may predicted based on, for example, one or more dynamic factors, to advance, or not, the associated customer segment, at the beginning of interaction processing. For example, an a-priori determination is made as to whether treating, for example, a silver customer as, for example, a gold customer, may very likely lead to an outcome (e.g. acceptance of an offer associated with a business opportunity), which would actually match the criteria for the customer's gold classification. If the chance of success is above a particular threshold value, a silver customer may be treated as a gold customer and, according to a business objective set for gold customers, be presented with a business opportunity that, in some instances, would otherwise not have been presented to him/her as a silver customer.

Static factors that may considered in reassessing customer segment may include, for example, one or more of: changes in a customer's profile, changes in a customer's set of the business, changes in criteria applied by the business, a person's anticipated actual influence (for social media interactions) based on the person's prior interactions with the contact center or web monitoring history, etc., and others. For example, a customer with a potential to have a high influence in his or her social media network may be promoted in his customer segment.

With respect to changes in the customer's profile, the customer may have moved, for example, to a more prestigious geographic location, may have recently bought a home, may have changed his/her marital status, and/or may have changed his job/salary, all of which may be considered as factors in moving the customer up or down in customer segment.

With respect to changes a customer's set of the business, the enterprise may change the list of criteria/attributes within the customer model that are used to assess customer segment. For example, the enterprise may add or remove a "klout score" (social media popularity/influence) as a factor to be considered, and/or remove a factor such as "owns TV" because such factors are no longer differentiators for giving different treatments.

With respect to changes in criteria applied by the business in determining customer segment, the enterprise may have a new criteria/rule for different customer segments (gold, silver, and bronze), based on regulations (e.g. Basel 3 for banking), or re-assessment of previous criteria (e.g. a previously bad/high-risk living location may gradually become good), or new statistical findings (e.g. different correlation between sex/age and car driving safety).

Exemplary dynamic factors that may be considered for reassessing customer segment may include, without limitation, new business offering(s) that might be of interest for the given customer, cross-/up-sell opportunities during a given interaction (which may depend on interaction/media channel), the availability of (e.g., highly) skilled agent for the cross-/up-sell offer being at the same time a good match for the given customer, and other side-effects of a given interaction, such as visibility to a social media community or the like. With respect to new business offerings, particular services or products with associated criteria for gold/silver/bronze customers may be identified, during the current interaction, as being of interest to the particular customer. For example, the customer may expressly indicate interest in the service or product. The customer may be reassigned to a customer segment based on the identification of such product and/or associated criteria. The re-assignment may be, for example, a general re-assignment, or on a per (sub-) set of offering.

With respect to cross-/up-sell opportunities, a conversation between an agent and customer may go well, and could open an unexpected opportunity for a promising cross-/up-sell, but only if the customer were treated as belonging to a higher segment (e.g. silver customer treated as gold). In this instance, the customer may dynamically be reassigned to the higher customer segment.

With respect to availability of (e.g. highly) skilled agents for a cross-/up-sell, those agents may be reserved for treating calls from gold customers. A particular one of the reserved agents may be deemed to be a good fit for handling a current interaction with a particular silver customer. In such case, the silver customer may be treated as a gold customer, and the pending interaction for that customer may be routed to the reserved agent.

According to one embodiment, a new interaction with the customer may trigger the re-assessment of the customer segment based on one or more of the above-described static and/or dynamic factors, prior to determining how the new interaction should be handled. While typically a main use case for dynamic customer segmentation is "promotion"—by which the customer is promoted to a next higher customer segment, one of more of these triggers (typically dynamic reasons) may be reasons for demoting a customer to some lower (e.g., a next lower) segmentation status than what is stored for the customer in his or her customer record. Dynamic reasons for demotion may include, for example, knowledge that the agents that are currently available to serve the customer are not a good fit given the current customer segment, a high interaction rate with a customer who is poised to pass the given customer in ranking, unavailability of a best fit media channel for a given customer, and/or others.

In one embodiment, one result of a demotion in customer segment may be that a business opportunity associated with the higher customer segment, is bypassed. Thus, if an agent who is not a good fit for the current customer segment handles the interaction with the customer, demoting the customer to a lower customer segment prior to such agent handling the interaction may prevent the agent from presenting a business opportunity, which, if presented by the particular agent, would likely have not resulted in success.

According to one embodiment, for an incoming interaction, the routing strategy starts with the a-priori re-assessment of the customer segmentation in response to receipt of the incoming interaction. Depending on the outcome, a treatment of the dynamically determined segment is then applied going forward for some time period, over some configurable set of interactions, and so forth. As described above, the re-assessment (or initial assessment) may consider one or more static factors (unrelated to the given new interaction(s)) and/or one or more dynamic factors (specific circumstances of a given interaction), or combinations thereof.

In one implementation approach, the customer segment evaluation prior to processing an outstanding interaction comprises computation of probabilities of all (or a defined subset) of possible business results of a given interaction. If the probability for a business outcome that would put the customer in a higher-ranked segment is above a configured threshold, then the interaction is treated in accordance with this higher-ranked segment. Once the probabilities are processed, the customer's service level is adjusted (promoted or demoted) accordingly. As noted above, the promotion or demotion of the customer's service level may be on a per-interaction basis, or more long-lasting. The service level adjustment may be applied both to inbound (initiated by customer) as well as outbound (initiated by contact center) interactions, as well as to different media channels (such as voice, email, chat, web browsing and social media). Also, once promoted (or demoted) to a customer segment, first and second business objectives for the new customer segment may be evaluated in selecting an agent to handle the interaction. According to one embodiment, an agent with a higher likelihood of success of handling the first business objective may be selected over a second agent with a lower likelihood of success of handling the second business objective, even if the value of the first business objective is lower than the value of the second business objective.

Figure 7:
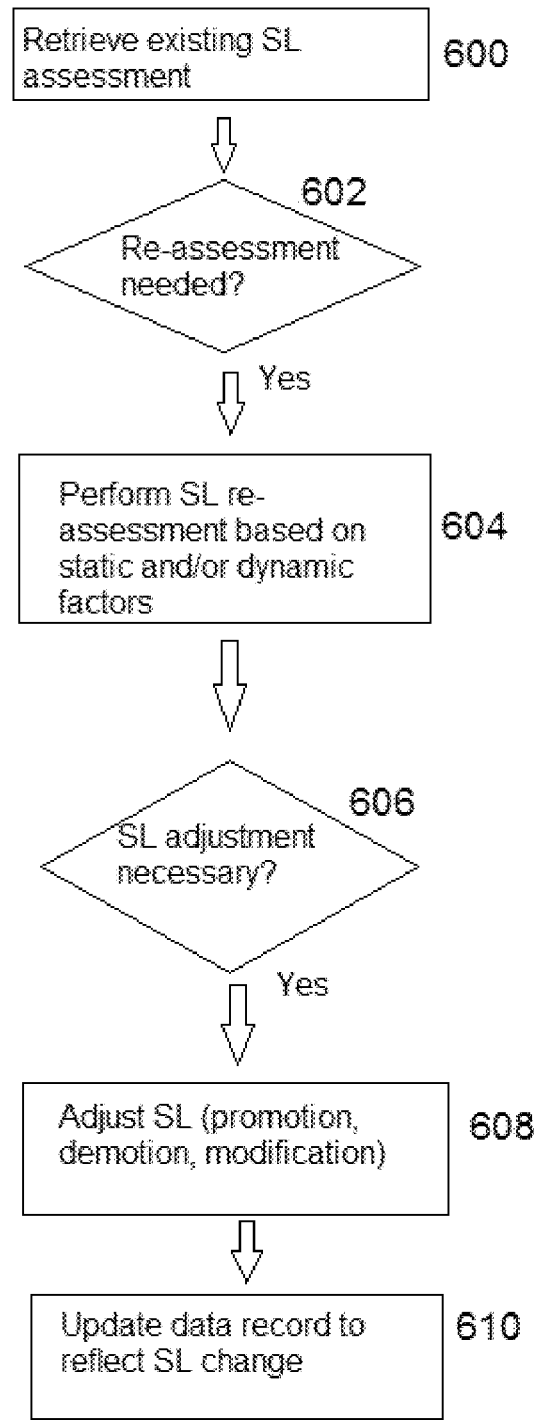
FIG. 7 is a process flow diagram illustrating a dynamic customer segmentation routing scheme according to this disclosure.

FIG. 7 is a flow diagram of a process for dynamic customer segmentation according to one embodiment of the invention. The process may be implemented by a processor based on instructions that are stored in memory. A person of skill in the art should recognize, however, that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and in step 600, the processor detects a pending interaction associated with a customer and retrieves an existing customer segment service level assessment for the customer. According to one embodiment, the detection of the pending interaction acts as a trigger to retrieve the customer segment service level. The existing segment information may be stored, for example, in a customer profile record for the customer.

At step 602, the processor performs a test to determine whether a re-assessment of the customer segmentation designation is to be performed. This test may be performed periodically, or in real-time upon detecting a particular occurrence, such as, for example, upon receipt of a new interaction request. For example, the test to determine need of re-assessment may be performed by the routing server 20 in response to receipt of a request from the call server 18 to route a pending interaction.

If the outcome of the test at step 602 is negative, the routine returns and cycles. If, however, the outcome of the test at step 602 is positive, the routine continues at step 604 to perform the re-assessment in the manner described above. The re-assessment may use one or more of the static or dynamic factors, or some combination, and may be based on anticipated outcome of the pending interaction that the customer is about to engage in. In this regard, in performing the re-assessment, the processor may be configured to determine the chances of successfully achieving a business objective, which may be a business objective for the current customer segment, a next higher-ranked segment, and/or lower-ranked segment. According to one embodiment, a rule or set of rules are invoked to re-assess the customer segment service level. The rules may take into account the static and/or dynamic factors in order to do the re-assessment.

At step 606, a test is performed to determine whether a service level adjustment is required. If not, the routine returns to step 602. If, however, a customer segment service level adjustment is required as a result of the re-assessment, the routine continues at step 608 to initiate the adjustment (promotion to a given customer segment service level, demotion to a given customer segment service level, modification of an attribute of the existing service level, etc.). The routine then continues at step 610 to store the new customer segment service level. The re-assessed customer segmentation data may be stored temporarily (e.g., without modifying the customer segment information in the customer record). In another embodiment, the current customer segmentation information in the customer record is replaced with the re-assessed customer segmentation data.

According to one embodiment, the adjustment of the customer segment service level causes an interaction with the customer (e.g. atomic interaction or a task associated with a case), to be processed differently (e.g. with a different level of service, different business objectives, etc.) than the processing prior to the adjustment. For example, the skill set of the agent handling the interaction may differ, priority in which the interaction is handled may differ, business opportunities presented to the customer may differ, and/or the like.

According to one embodiment, if the re-assessment is temporary, the customer reverts back to the customer segment that is stored in the customer record after the current interaction (or a discrete number of interactions) is over.

Adaptive Business Objective Routing

Typical current contact center interaction routing (agent assignment) assumes that the business objective (BO) to be achieved for the given interaction/activity is analyzed and defined at an initial stage of interaction processing and fixed. Using the existing, fixed BO, the agent routing logic generally tries to find the best matching agent for the particular BO. If the best matching agent is not available, the matching requirements are relaxed until an available agent is found. One of the drawbacks of this approach is that the BO (e.g., an up-/cross-sell) might be addressed at a low quality level (i.e., by a less qualified agent) and thus might lead to customer dissatisfaction (failure of the BO or reduced likelihood of future success with the particular customer).

According to one embodiment, instead of relying upon a fixed BO during the agent assignment process, an adaptive business objective routing strategy adjusts the business objective where necessary so as to minimize the opportunity for customer dissatisfaction in the event an appropriately-skilled agent is not available to handle an inbound interaction. According to one embodiment, the business objective may be composed of several elements or factors: (1) a primary reason for the interaction, typically as determined by a chosen interaction channel (as potentially refined through an IVR dialog); and (2) a set of business opportunities (e.g., cross-/up-sell offers).

According to one embodiment, a reason for the interaction may be identified expressly or implicitly according to various mechanisms. For example, a call reason may be inferred based on the customer's interaction with the IMR server 34 (FIG. 2). For example, the IMR server 34 may be configured to ask the customer an open-ended question to elicit information on the reason for the call. For example, the IMR server 34 may be configured to ask "How can I help you?" The customer may answer by speaking a reason for the call, such as, for example, "Am I eligible to upgrade my phone?" According to one embodiment, the phrase uttered by the customer is analyzed by the speech analytics module 40 and the call is then categorized into a particular category, such as, for example, an "upgrade eligibility" category. In other embodiments, the question asked by the IMR server 34 is not open-ended, but limits the caller's response to, for example, a particular subject. Of course, the IMR server 34 may also be configured to function as a traditional IVR where the customer is provided a list of reasons for the call, and the customer presses a number that matches his or her reason for the call. The call reason may be deduced from the particular number pressed by the customer.

In other embodiments, a call reason may also be deduced based on other modalities, such as, for example, the customer's interactions using other communication channels, such as, for example, the Web, retail shops, email, chat channels, mobile applications, social media channels, and the like. Multi-channel analytical solutions such as, for example, Genesys Text Analytics offered by Genesys Telecommunications Laboratories, Inc., may be used to analyze a customer's previous engagement to identify a previous problem and/or needs before connecting a current call to a contact center agent. For example, a customer may be browsing a company web page relating to "Flying with Pets Policy" when the customer selects a "speak with an agent" option. Information on the page being browsed may be transmitted along with the request to speak with the agent, and from the transmitted information it may be inferred that the customer's reason for wanting to speak with the agent is related to "Flying with Pets."

With respect to identifying business opportunities as part of identifying business objectives for the contact center, such business opportunities may be identified based on criteria such as, for example, knowledge of the customer, current business goals, and the like. Exemplary business opportunities may include credit card upsell, contract renewal upsell, and/or the like. According to one embodiment, business opportunities for a particular customer are identified based on the customer' profile and currently available matching business offerings. According to one embodiment, business opportunities may be identified based upon customer segment identification (which may be re-assessed prior to handling the current interaction as discussed above).

According to one embodiment, a purpose or goal of a business opportunity is to maximize business outcome and/or customer satisfaction. A desired business outcome may vary from organization to organization, and/or from time period to time period. For example, the organization may have a global target for a particular NPS (net promoter score), sales, collection, and/or profit. More specific goals may then be set for different product lines, business units, and/or the like. For example, sales based business opportunities may have goals relating to conversion rate, revenue, and sales, while service based opportunities may have goals relating to customer effort, NPS, and/or the like.

According to one embodiment, after a BO is identified that is deemed to be important to the contact center due to its potential to maximize business outcome and/or customer satisfaction, the routing logic tries to find a best matching agent for addressing both parts of the BO (reason for the interaction and the identified business opportunity). According to one embodiment, the assignment logic (e.g. routing strategy/logic) searches for agents having the skill set (e.g. qualification, certification, etc.) identified for the BO. If no such agent can be found, then, according to one embodiment, the BO is adjusted, e.g., by selecting a second best BO (e.g. with the same reason for the interaction but second best in terms of business outcome) for the given customer. The second BO may be deemed to be of lesser importance to the contact center relative to the first BO due to its lesser potential to maximize business outcome and/or customer satisfaction. The process is then repeated until an appropriate agent is found to handle the interaction according to the (possibly-adjusted) BO.

According to one embodiment, even if a suitable agent for handling the BO is identified, evaluation of a likelihood of success of the particular agent with respect to the particular BO may be low, or lower than the likelihood of success with respect to the second best BO. In this scenario, the second best BO may be selected to be acted upon instead of the first best BO.

When the process completes, the customer's profile is updated accordingly to reflect the actual BO used. At the next interaction opportunity (i.e., the next time the customer interacts with the contact center), a new attempt may be made to address the top BO.

In a representative implementation, and given the interaction channels, the customer profile, and the set of offers, a set of business objectives are identified for the customer in response to detecting a pending interaction with the customer. During the agent selection process, the routing logic seeks to find a best matching agent for addressing both the primary reason for the interaction and the identified business opportunities, and begins, according to one embodiment, with a first (e.g. best or highest ranked) business objective. If no agent is available to address both the interaction reason and the currently identified business objective, a next best BO is used, and so on until an appropriate agent is found to handle the interaction according to the (potentially-adjusted) BO.

According to one particular implementation, a rank $R_{ik}$ is assigned to each pair of $i^{th}$ BO (I=1 ... N) and an available agent (k=1 ... M). The rank may be related, for example, to a business outcome (e.g., profit) that may be achieved from an interaction with certain BO by agents of certain skills. For example, a BO projected to produce a profit of $100 may be ranked higher than another BO projected to product a profit of $80. According to one embodiment, in addition to business outcome, a probability of success of achieving the business outcome by the particular agent is also considered in assigning the rank to a BO/agent pair. The probability of success may be determined, for example, based on the agent's historical performance with respect to the BO. According to one embodiment, the rank may be calculated based on a calculation of an expected value as is commonly understood in the field of probability theory. In one embodiment, the expected value is used as the rank.

According to one embodiment, the expected value may be a weighted average of all possible business outcomes for the particular agent. In one example, the expected value E(X) may be calculated and used as follows. Each BO has a value S in case of success. S may depend also on given customer and other factors. In some examples, a loss value L may also be introduced. In most cases L is 0, but may also be positive (if just the attempt itself has a positive effect) or negative (if the failed attempt has negative impact on future business with the customer).

Each X=BO/Agent combination has a probability P of success, depending on agent's abilities to "sell" the BO to the given customer in the given situation. Then:

$$E(X)=P*S+(1-P)*L$$

According to one embodiment, the expected value E(X) is calculated for all possible BO/Agent combinations, and the one with the highest value is chosen.

According to one embodiment, all possible ranks and/or expected values may be defined in advance or estimated during runtime, e.g., based on recent contact history. For every interaction that is waiting to be routed to an agent, a set of both business objectives and available agents are obtained. A best interaction-agent match is then selected according to a maximum of ranks.

The resulting interaction (between the selected agent and the BO, as adjusted) will then be presumed to occur to potentially maximize the business outcome while avoiding customer dissatisfaction.

The phrase "business objective" is not intended to be limited to any particular product implementation.

A generalization of this approach is to estimate a likelihood of achieving the given business objective by a particular agent for a current customer; if the likelihood is below a configurable threshold then the process moves on to try to satisfy a next best business objective.

If all anticipated outcomes are below the threshold, one or more possible follow-up strategies may then be evaluated. These include, without limitation, selecting a business objective that is closest to the threshold, applying one or more weights to the business objective and then making a selection, routing based on the initial reason for the interaction without further adjustment according to business objective, and so forth. All of these variant scenarios are within the described solution.

Figure 8A:
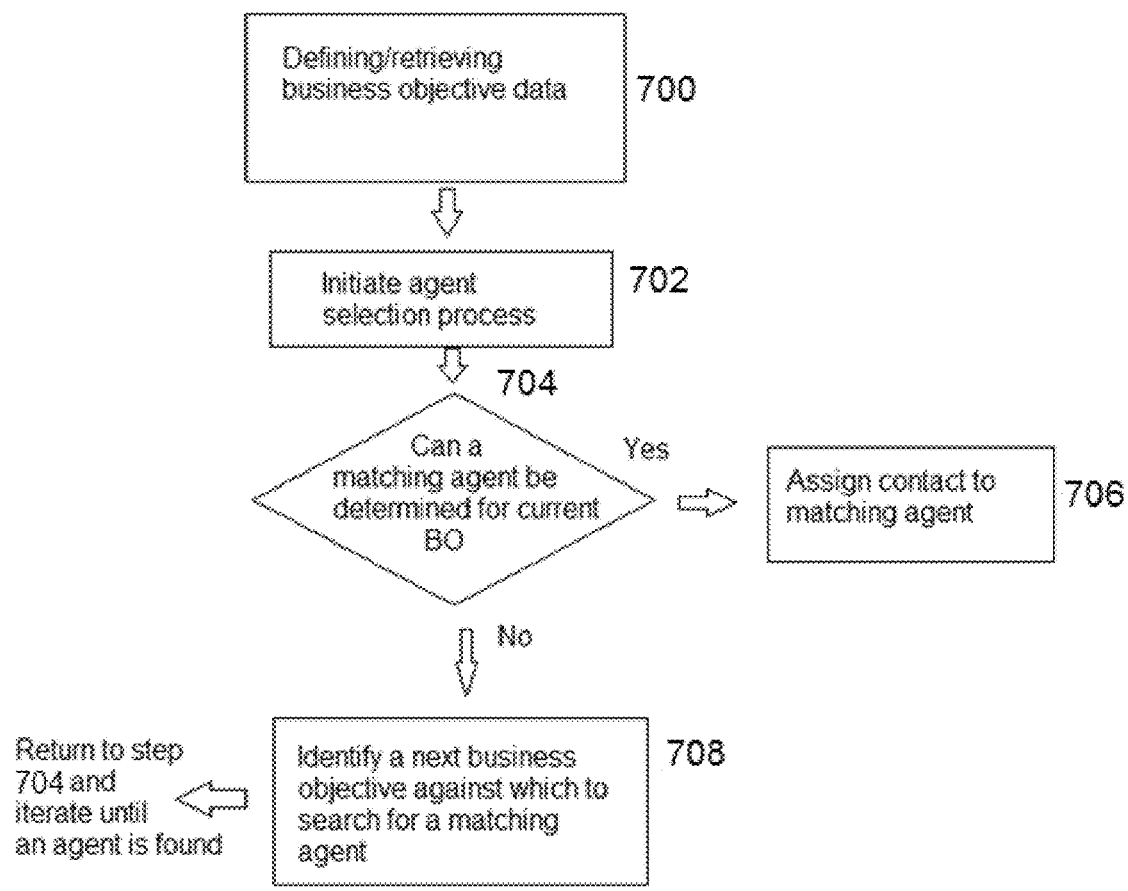
FIGS. 8A-8B are flow diagrams of a process for adaptive business objective routing according to this disclosure.
Figure 8B:
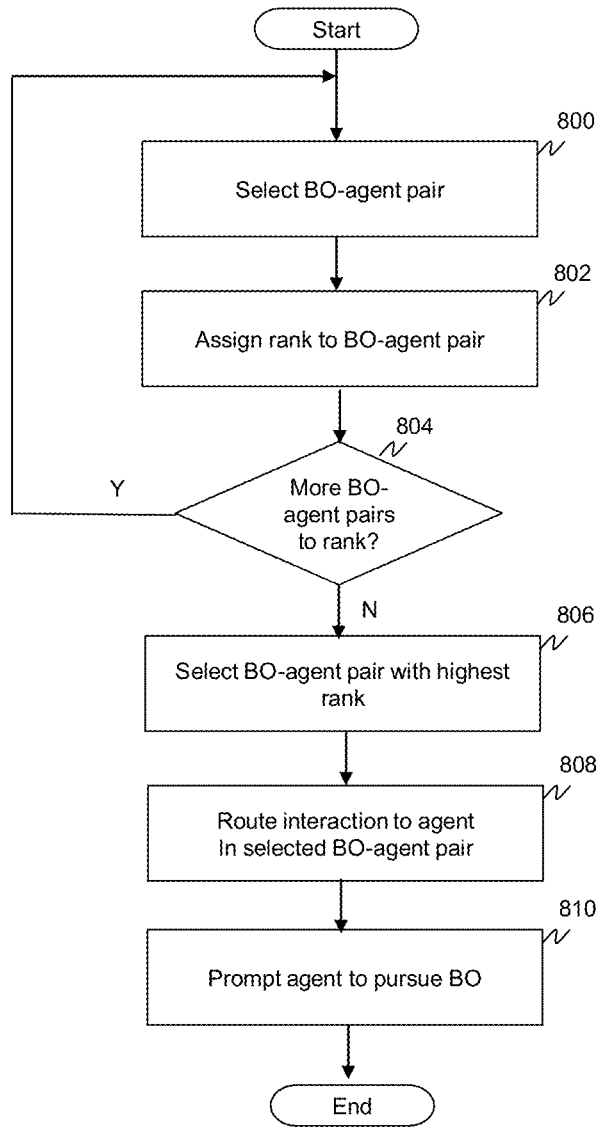

FIGS. 8A-8B are flow diagrams of a process for adaptive business objective routing according to one embodiment of the invention. The process may be implemented by a processor based on instructions that are stored in memory. For example, the process may be implemented by a software module running in the routing server 20. A person of skill in the art should recognize, however, that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The routine begins, and in step 700, the processor detects a pending interaction with the customer (e.g. atomic interaction or a task associated with a case), and identifies or retrieves the business objective data as described above, including, for example the expressed or deduced reason for the interaction, and a first identified business opportunity with respect to the customer.

In step 702, the processor begins the agent selection process. In this regard, the processor may interact with the statistics server 22 for identifying availability of agents having skills that a commensurate to the identified business objective. The skill level of each of the identified agent may also be identified.

In step 704, the processor determines whether agents that are fit to handle each of the identified business objectives have been found. Such fit may be based on not only availability of the agent, but also how the skill level of the agent identified as having the appropriate skills, compares to the skill level that is deemed to be appropriate for handling the particular business objective. If the skill level of the agent is above a threshold level identified for the business objective, the agent may be deemed to be the right fit for the business objective.

In step 706, one or more of the matching agents are assigned to the business objective.

If, however, the outcome of the test at step 704 is negative (no matching agent for addressing the current business objective can be located), the routine continues at step 708 to identify a next business objective. The next business objective may identify a second business opportunity with respect to the customer.

Once the set of business objectives and matching one or more agents are identified, the process proceeds to select a BO-agent pair based on an assigned rank of the BO-agent pair as depicted with respect to FIG. 8B. In this regard, in step 800, the processor selects a first BO-agent pair, and in step 802, assigns a rank (which could be just the expected value) to the pair. According to one embodiment, the rank may be based on identification of a business outcome and probability of success by the particular agent in achieving the business outcome. According to one embodiment, an expected value for the business outcome is calculated and used to assign the rank.

According to one example, a first BO may have an expected business outcome of $100, while a second BO may have an expected business outcome of $80. However, a first agent identified as a match for handling the first BO may be identified, based on past performance in handling the first BO, as being 40% successful for the first BO. A second agent identified as a match for handling the second BO may be identified, based on the second agent's performance in handling the second BO, as being 80% successful for the second BO. According to one embodiment, the process assigns a rank to the second BO-agent pair that is higher than the rank assigned to the first BO-agent pair. In this regard, the process deems it more valuable to pursue the second BO, although not the best in terms of business outcome, instead of the first BO.

In step 804, a determination is made as to whether there are more BO-agent pairs to rank. If the answer is NO, the processor evaluates the assigned ranks and, in step 806, selects the BO-agent pair with the highest rank.

In step 808, the pending interaction is routed to the agent of the selected BO-agent pair. In this regard, the call routing server 20 may transmit instructions to the call server 18 identifying an address of the agent device to which the interaction is to be routed.

In step 810, the agent is prompted to pursue the business objective. For example, the deduced reason for the interaction may be displayed on the agent device, and the agent may, upon seeing such reason, address the call reason with the customer. The processor may also display a prompt to present a business opportunity included in the BO, to the customer, along with scripts to help guide the agent in presenting such business opportunity. As a person of skill in the art should appreciate, the business opportunity that is presented by the particular agent may not necessarily be the one with the highest yielding business outcome.

According to one embodiment, the business objectives may be associated with a particular customer segment. In this regard, the customer may first be dynamically reassigned to a particular customer segment prior to determining which business objectives to consider in selecting an appropriate agent.

Case-Based Routing

Embodiments of the present invention are directed to case routing as opposed to atomic interaction routing. In one embodiment, case-based routing may be seen as taking a holistic view on the entire case by considering the past steps, a next step, and anticipated future steps of the case, and selecting an agent based on this holistic view. In this regard, a routing routine attempts to select an agent who is familiar with the pre-context of the case, has skills to perform anticipated follow-up processing steps, and/or one that is engaged with potentially related other interactions with the given customer. In this regard, the selected agent is one who is deemed to be a good fit for the entire case, or at least for a certain subset of tasks associated with the case.

According to one embodiment, customer segmentation may also be adjusted proactively in advance of handling one or more steps (tasks) of a particular case. The mechanism may be similar to adjusting customer segmentation for atomic interaction routing that is described above.

According to one embodiment, the agent that is selected to route the one or more steps of a particular case may be based on business objectives of the contact center/enterprise. According to one embodiment, the agent who is has the highest probability of maximizing the business outcome while avoiding customer dissatisfaction is selected as described in further detail above.

Figure 9:
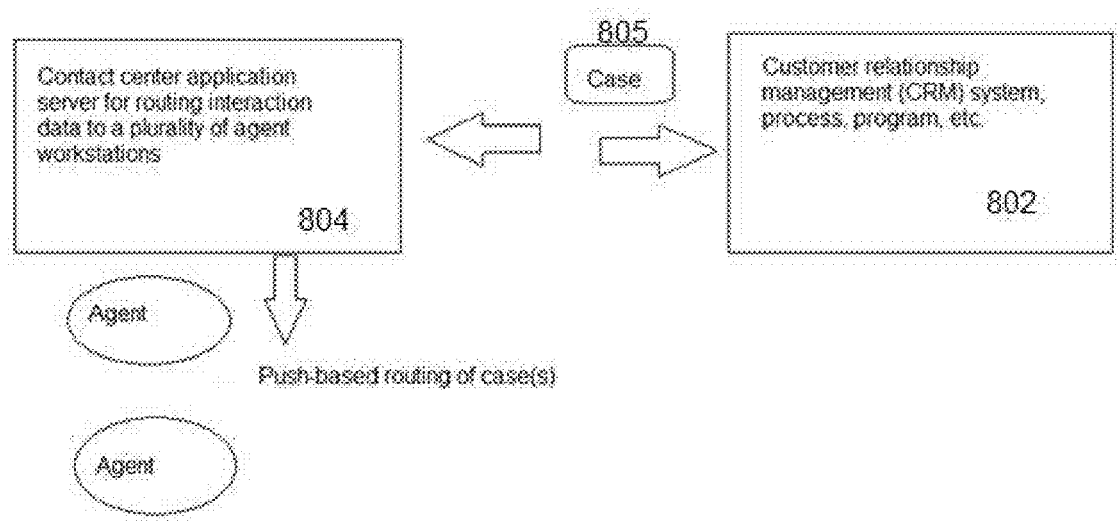
FIG. 9 is a diagram illustrating a case routing scheme according to this disclosure.

FIG. 9 is a block diagram of a contact center solution suite (such as Genesys®) 804 that is integrated with a CRM enterprise service and marketing application (such as Salesforce.com®, or Oracle® Siebel®) 802. The identified products/systems are provided for descriptive purposes but are not intended to be limiting. Thus, in an alternative embodiment, the logic of case routing may be implemented outside of the CRM context, e.g., in Genesys® Orchestration and Conversation management.

An integration of this type allows enterprises to leverage the synergy of two critical functions, namely, the management of customer data (through the CRM system), and the management of real-time interactions (through the contact center). Through a seamless integration of CRM and contact center solutions, enterprises can offer their customers' choice of access options such as e-mail, fax, Web chat, work item, and traditional voice. Customer interactions are handled in real-time, and they are automatically prioritized, matched, and assigned to the best available resources, e.g., based on the customer need, history, class of service, and business rules. Preferably, the contact center solution provides contact center software, predefined routing strategies and templates, installation and ongoing support. To this end, the platform preferably provides SIP-based functionality (to enable agents to be located wherever they are needed, thereby freeing the contact center from PBX constraints), business-based interaction routing (to enable customers to be connected to the right agent, preferably using routing templates configured to the customer's business needs), and real-time and historical reporting (to enable tracking of customer service).

The above-described platform is extensible to enable an additional routing strategy that is referred to herein as "case routing." This routing strategy is described below using an example implementation.

Preferably, the integrated system (e.g., based on the Siebel® desktop, although this is not a limitation) uses a single agent interface for both CRM and customer interaction management. A single agent login to the desktop enables the agent access to embedded e-mail, chat and work in the Siebel desktop, removing the need to toggle between applications. The approach provides for a single point of real-time management for inbound call handling, e.g., through the Siebel CRM interface. To facilitate the techniques of this disclosure, in one embodiment the contact center routing mechanism leverages Siebel CRM data Customer (or "case") records 805 that preferably are attached to every interaction (voice, e-mail, work item, etc.), including transfers between agents, reducing handling time. Other CRM systems may use other nomenclature in lieu of a "case," and the techniques should be viewed as applying to such other CRM-based environments irrespective of the particular nomenclature adopted. Preferably, imported and real-time updates of CRM contact lists drive contact center-based outbound campaigns, thereby increasing transaction opportunities and upload of campaign results. The integrated system also provides for real-time intelligent routing for content management for all types of content including, without limitation, documents, faxes, web forms, images, etc., as well as real-time workflow optimization, such as service requests, customer orders/fulfillment, and provisioning. By providing customer center agents with a complete view of customer data, more personalized cross-channel conversations are enabled. The integrated approach facilitates real-time handling of customer requests, preferably based on customer class of service, needs, history and profile. The unified desktop approach also greatly reduces operating costs and increases customer responsiveness.

The contact center may provide an application programming interface (API) or SDK (Software Development Kit) by which the CRM provider integrates the CRM system. For example, the contact center may provide a Customer Interaction Management (CIM) platform that exposes scalable software modules with service-enabled APIs that allow third parties to integrate CRM systems, services and software. Applications communicate through an abstraction layer or through Web services, or through low-level (fine-grained) interfaces. As described above, and in an alternative embodiment, the CRM system is part of the contact center itself.

In the prior art, the contact center implements one or more types of agent-based routing, such as skills-based best available agent routing. According to this routing strategy, this prior technique is enhanced to take into consideration case-based information. In "case-based" routing, the decision about which agent should receive a particular interaction for processing within the context of a contact center is determined at least in part on a "case record," e.g., (in an CRM embodiment) associated with a CRM-sourced interaction. Thus, CRM system or server models a customer support interaction (between one of its customers and the system) as a "case." A case (or "ticket" or "work item") has an associated case record having given information identifying the case, its type, an anticipated workflow (through a set of defined or ordered steps) to potential resolution, anticipated timing, escalation paths, and the like. Depending on the CRM system from which the case originates, a case may be associated with a particular template depending on the nature of the customer support issue.

In case routing, a case record (or information therein) associated with a case is used to determine which agent in a set of agents in the contact center should be identified to undertake additional work/processing of the case. As will be seen, a best or target agent typically is selected based on one or more factors, such as an identity of a particular next interaction or step in the processing of the case (as defined by the case workflow), one or more anticipated future interactions for the given case and that should preferably be handled by a same agent, the existence of one or more previously-performed interactions for the case, including whether any such interactions have been re-opened, remaining completion time for the case, and the like. Preferably, when the case routing strategy is implemented, an entire case record (or some material portion thereof) is taken into account in determining which agent of a set of agents should be identified as a target for an inbound contact associated with the case.

In case routing, and instead of routing individual interactions (e.g., voice calls, chats, e-mails, etc.) to an appropriately skilled best available agent, once an interaction is associated with a particular case, the routing of the interaction is influenced by one or more case-based parameters. Moreover, preferably what gets "routed" is the case itself (as opposed to the interaction associated therewith). As a simple example scenario, assume because of the nature of the case some kind of future interaction might be needed with a customer, where that future interaction is triggered at a future certain and/or upon timeout of a case idle time (or some other trigger). With case-based routing, once that trigger occurs, the "case" is routed to the appropriate agent (or to his or her queue) with the right skill and availability, and the agent then makes the necessary communication with the customer (e.g., by phone, text, email, chat or the like). With case routing, the case is pushed for handling to the agent proactively when the case-based trigger occurs, and this reduces the likelihood that the agent will ignore the interaction (over some other interaction that the agent might desire to handle first, although of course there will be situations wherein some other assigned interaction has a higher priority than the case). With case routing, preferably cases are pushed to the agents (or their queues) in the order they are submitted (or otherwise based on the case triggers, or based on other priorities) and are routed to the agents with the appropriate skills to handle those cases of that type. Preferably, and because case-based routing involves case-based parameters, when an agent/user receives a case, (absent more higher priority interactions that must be worked first) he or she generally works the case in lieu of electing to do some other interaction. Thus, in case based routing, preferably a case is provided to the agent (by being pushed for immediate processing, or otherwise being pushed into the agent's workbin for being immediately pulled) for handling by the agent. Whether characterized as push or pull, the described model used in case routing ensures that workflow associated with a CRM case is enforced rigorously, and it ensures that the target agent works proactively to resolve the case (or to move the case to another agent or agents who can do so).

With case routing agents can communicate and otherwise interact with one another, and preferably multiple agents are each able to view the case concurrently. If an agent decides he or she will transfer a case to some other agent or entity (assuming the receiving agent can be shown to be a good fit), preferably the receiving agent/entity has the option to accept or reject the case, and preferably cases can be escalated with a-priority so that they are worked first. If a case is updated, preferably an update is pushed to the agent that either handled the first interaction or is still working the case.

The case routing technique may also be implemented in the context of assignment logic that uses a reservation approach, wherein the logic performs arbitration among multiple request for some agent based on priority, where priority in turn may be based on interaction age, due time, and the like.

According to this disclosure, it is assumed that there is a mechanism (e.g., an API, a Web service, some other request-response protocol, or the like) for passing information between the CRM system and the contact center server that is responsible for contact center agent selection. A case is opened in the CRM system in the usual manner when an end user/customer opens a ticket. A case has an associated case identifier (caseID), and it is associated with a data record, sometimes referred to herein as a case record. As noted above, typically the case record is a construct associated with the CRM system and identifies the case, its type, an anticipated workflow (through a set of defined or ordered steps) to potential resolution, anticipated timing, escalation paths, and the like. The case record may include the contact history for the case if the case is being re-opened from an earlier interaction. More generally, the case record is an object (or a case object) in an object-oriented database system associated with the CRM. The contact center typically includes a contact center server API for external case management to link to interactions (both active and historical) in the contact center environment.

Preferably, the contact center reporting systems or sub-systems report on how cases are handled. Reports may include, without limitation, how many cases have been worked, closed, resolved, are waiting for information, and the like, as well as how many of each state a particular agent worked. Case routing also may provide more granular reporting than conventional reporting of agent interactions. Thus, for example, when a case is pushed to an agent and the agent accepts it, the time that the agent works on this case can be monitored and reported. Once the agent returns the case (e.g., by closing or resolving it, by seeking more information, etc.) the system notes the time incurred, and a new case may then be pushed to the agent. By monitoring handling times, and assuming deterministic cases with fixed processing steps, the contact center management obtains a view into how long particular agents take to handle a case and, if appropriate, can institute training and other remedial actions to address deficiencies. The reports may also indicate which agents are working the hardest cases, which agents are handling many cases and the nature of those cases, etc. The reports may also indicate when an agent consults another agent with respect to the case; if many agents are consulting with a particular agent, this may indicate that the consulted agent has the most relevant knowledge about the case type and/or that other agents need appropriate training. When cases are transferred between or among agents, such transfers are also reported, once again indicating the possibility for the need for additional agent training. Escalations preferably are reported as well, thereby helping management understand when other processes need to be changed (depending on the nature and extent of those escalations).

Preferably, an agent that receives a case (and being an "owner" of a new case) can access the case history associated with the caseID. Preferably, only the agent that is actively working the case (i.e., has an active window open and in focus) is reported as time against the case. This allows a first agent to work the case for some time period and then not lose credit for such work when the case is transferred to a second agent. The second agent gets the time reported only for the time he or she is actively working the case (i.e., has an active window open, etc.). Preferably, the CRM records also reflect the same activities by each agent or user that works the case.

Preferably, case routing does not impact or change case history. Thus, irrespective of the identity of the agent who last works the case, all agents who worked the case preferably receive credit for their work. By making sure all time is accurately recorded (e.g., by monitoring open and in-focus activity windows on the agent desktops), the contact center and/or CRM provides a comprehensive report of time spent on each case, the identity of the agents/users that worked the case, and any issues (trends, anomalies, etc.) identified.

Case routing and associated reporting in this manner can expose valuable information about an agent and whether his or her perceived value is backed by actual data. As noted above, in case routing agents receive cases to handle based on case-specific parameters (and thus they cannot necessarily pick and choose their interactions), the case routing data provides a much more nuanced and accurate view of an agent's activities. Thus, an agent may have a very high number of transfers and consults, or a low close-rate, etc., and such data (even if associated with what otherwise appears to be highly-efficient agent) may indicate that the agent is actually having problems or perhaps is not working up to his or her potential (actual or perceived). The information may also indicate that the case routing logic needs to be adjusted. Conversely, case routing and associated reporting can also show that an agent that was previously considered only fair (e.g., for having a low number of closed interactions) is now on the receiving end of transfers and consults for many of the cases, if not the hardest cases. The agent has been closed the hard-to-work interactions that other agents had refused to pull from the work queue; however, now that the cases pushed based on case-based parameters other agents are leaning on this person so that they can work the cases they traditionally avoided.

Of course, there are merely representative examples but they show how case routing can provide very useful information about agent work habits that was not otherwise available when interactions are routed to agents in the above-described model. Preferably, the agent monitoring and case reporting statistics are generated in an automated manner; these records may be parsed, once again by automated systems, to generate output reports that identify (e.g., rank) agents by their case-handling capabilities.

More generally, case routing provides advantages over atomic interaction routing by enabling the interaction to be handled by an agent that is familiar with the pre-context, or who has the ability to perform anticipated follow-up processing steps, or who is engaged with potentially-related other interactions with the given customer, or the like.

Although there is no limitation regarding when case routing may be implemented, typically it may be done more often as a back office function, while atomic interactions are more likely handling by the contact center. If the contact center is operating less efficiently, it may be desired to use case routing to help the contact center work off any backlog or otherwise reduce delay.

According to one example of implementing case routing, a worker in an insurance company may open a case record in the CRM system 802. The case record may be, for example, for handling an insurance claim for a car accident involving the customer. According to one embodiment, the case record identifies a workflow of anticipated steps to be taken in handling an insurance claim. For example, the steps may include obtaining details of the accident, determining faulty party, authorizing the customer take the car to a bodyshop, scheduling a claims adjuster to go to the bodyshop to inspect the car, getting a report from the claims adjuster, authorizing the bodyshop to fix the car, and making payment to the bodyshop. As a particular step of the workflow is completed, information about the worker handling the particular step, date and time in which the particular step was handled, and the like, may be tracked in the case record.

According to one embodiment, the various steps of the workflow may be handled by one or more workers/agents of the enterprise. In this regard, an autonomous task is generated at a particular step of the workflow that requires agent action, and the task is routed to an agent determined to have the skill set for handling the interaction. According to one embodiment, instead of finding an agent with the skill set for handling an immediate next step of the workflow, an analysis is performed of one or more future steps of the workflow (following the immediate next step) for determining skill sets for handling each of the one or more future steps at the same time that the determination is made with respect to the immediate next step. The processor may be configured with logic to determine whether a single agent exists with skills to handle more than one of the identified steps. Again, the determination is made concurrently for all the identified steps. In this manner continuity may be maintained where possible in terms of agents handling the case. Thus, for example, if Agent 1 with skill A is available for handling step 1, but Agent 2 with skills A and B is available to handle steps 1 and 2, Agent 2 may be selected over Agent 1. Of course, the agent may most likely handle the two steps at different points in time. Moreover, the agent may initially just receive a task for handling the immediate next step in the workflow, and may or may not know that he has been assigned to the subsequent steps as well. Yet in some embodiments, the agent is informed of the assignment of the subsequent steps. Tasks for the subsequent steps may be generated concurrently with the generating of the task for the immediate next step, or at a later time. The generated tasks may be concurrently routed to the agent, or routed at different times. If a task for a subsequent step is routed at a later time, the processor detects that an agent has already been selected, and thus routes the subsequent task without invoking, for example, logic for making skill determinations for identifying a best agent for handling the subsequent task.

In traditional interaction/task routing a best target (agent) is defined based on:
  availability, occupancy etc.
  customer segment
  priority
  required skills to handle interaction of given media type
  agent's capacity
  customer interaction history (e.g. last agent routing)
  additional criteria such as up-/cross-sell opportunity and respective agent skills According to embodiments of the present invention, a complete case record may be considered when selecting best matching agent for routing a case record:
  particular individual interaction which is the next "step" in case processing
  anticipated future interactions for the given case (based on case class/category), which should be preferably handled by same agent
  already performed interactions for given case, which might have to be reopened potentially
  remaining completion time for whole case
  routing target is selected taking all above into account If multiple agents are identified as being equality suitable for handling a plurality of upcoming workflow steps, the agent that is ultimately selected may depend, for example, on the skill level(s) of the identified agents. An agent with a higher skill level may be preferred instead of an agent with a lower skill level.

According to one embodiment, as discussed above, instead of routing an autonomous task to the selected agent, the related case record is routed for giving the agent context of where in the workflow the current step belongs, and for understanding the history surrounding the case. According to one embodiment, routing of the case may be enabled by identifying a caseID in the task that is routed to the agent. The caseID may then be used to retrieve the case data from the CRM system.

According to one embodiment, the routing of an interaction or task to an agent may be triggered automatically based on parameters set for the case, and/or parameters surrounding one or more steps of the workflow. For example, tasks may be automatically triggered based on a date/time setting. Tasks may also be triggered based on an amount of time elapsed between two or more steps of the workflow, or since completion of a last workflow step. In this regard, the processor monitors for a trigger event, and, in response to detecting occurrence of such trigger event, automatically generates and transmits a task associated with the trigger event.

Combining Routing Strategies

Figure 10:
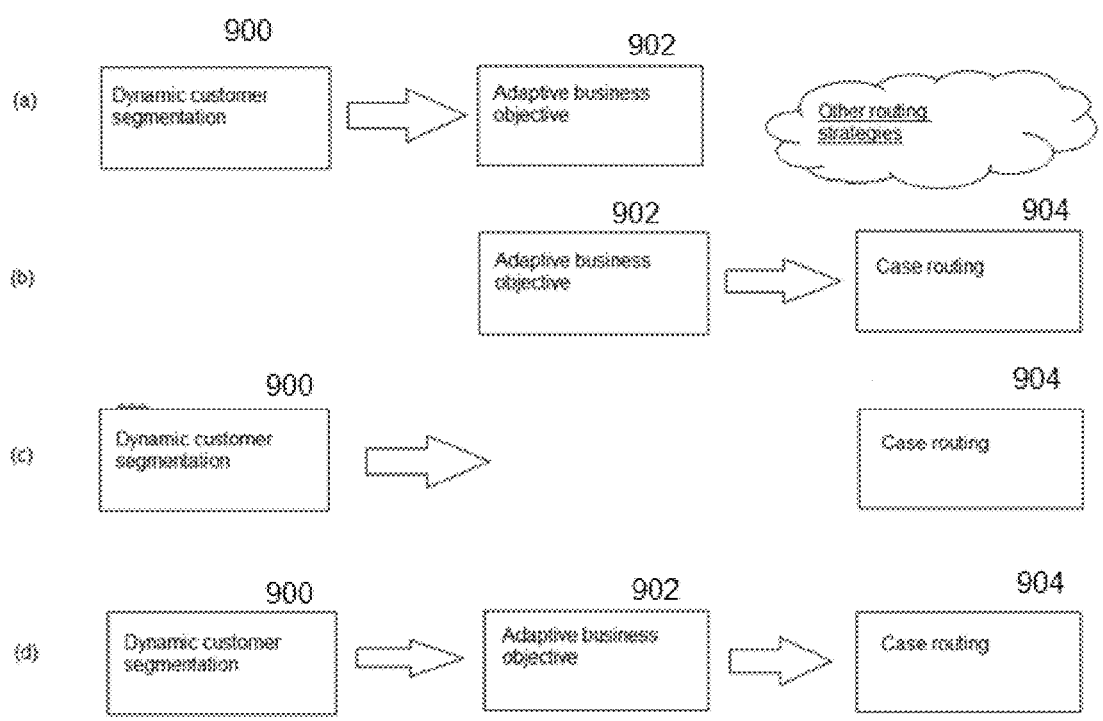
FIG. 10 is a process flow illustrating how two or more of the routing schemes may be carried out concurrently or sequentially to enhance contact center agent assignment logic.

As noted above, according to a feature of this disclosure, one or preferably multiple ones of the above-described routing strategies are implemented concurrently and/or in sequence. FIG. 10 illustrates various scenarios.

The routing strategies may be implemented on a per-interaction basis, or for multiple interactions.

As an example scenario (a), dynamic customer segmentation 900 is performed initially, followed by the adaptive business objective routing strategy 902.

Another example scenario (b) begins with adaptive business objective routing 902, followed by case routing 904.

As a second example scenario (c), dynamic customer segmentation 900 is performed initially, following by case routing 904.

Another example scenario (d) involves concurrent and/or sequential implementation of dynamic customer segmentation 900, adaptive business objective routing 902, and case routing 904.

The sequence or ordering shown above (strategy 900, then strategy 902, then strategy 904) is not intended to be limiting. Any sequence or ordering may be implemented depending on the use case. As can be seen in this drawing, the one or more routing strategies herein are designed to augment other routing strategies implemented in the agent assignment mechanism.

A customer may use a web-based configuration tool or other interface mechanism to provision or otherwise configure a custom routing strategy using the above-identified schemes, either alone or in combination with existing agent assignment mechanisms, such as those based on availability, occupancy, static customer segment (static), priority, required skills to handle an interaction of a given media type, agent capacity, customer interaction history (e.g., last agent routing), and other criteria, such as up- or cross-sell opportunities, agent skills, and the like.

While the above description sets forth a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

As used herein, agents may be assigned explicitly, e.g., by an agent assignment mechanism dedicated to that purpose, or implicitly, e.g., by an IVR.

Each of the various servers, controllers, switches, gateways, engines, and/or modules (collectively referred to as servers) in the afore-described figures may be a process or thread, running on one or more processors, in one or more computing devices 1500 (e.g., FIG. 11A, FIG. 11B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 11B:
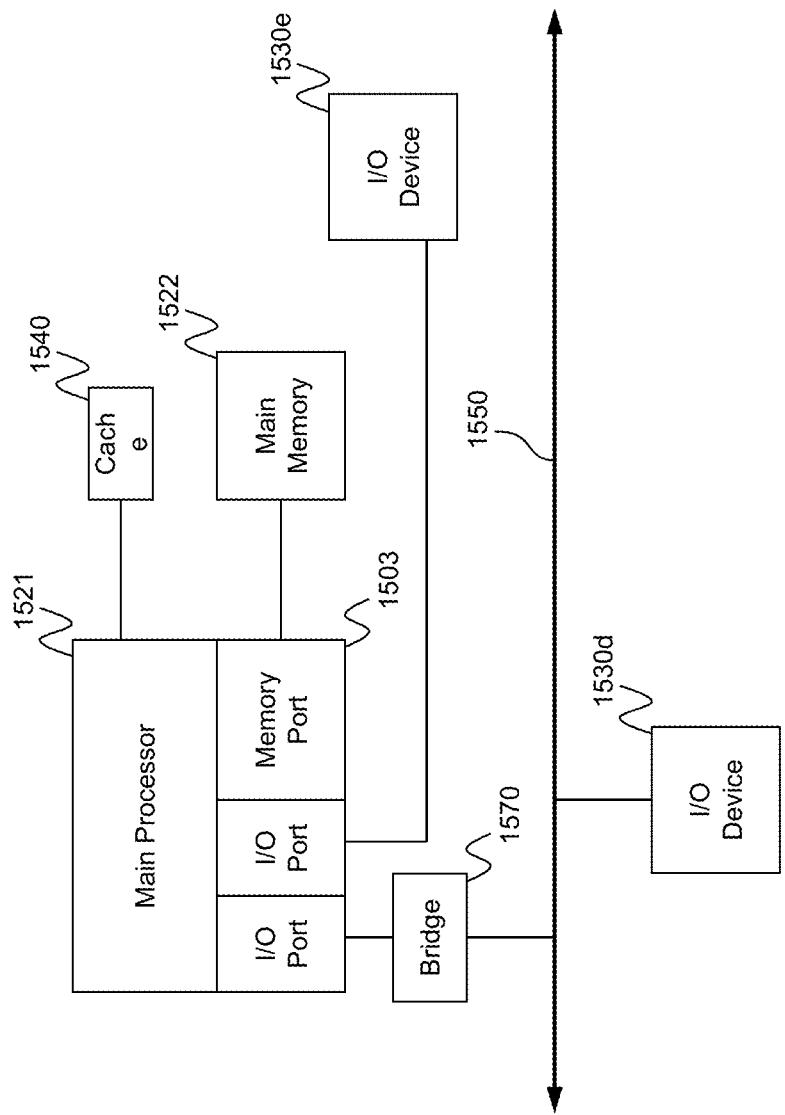
FIG. 11B is a block diagram of a computing device according to an embodiment of the present invention.

FIG. 11A and FIG. 11B depict block diagrams of a computing device 1500 as may be employed in exemplary embodiments of the present invention. Each computing device 1500 includes a central processing unit 1521 and a main memory unit 1522. As shown in FIG. 11A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 11B, each computing device 1500 may also include additional optional elements, such as a memory port 1503, a bridge 1570, one or more additional input/output devices 1530d, 1530e and a cache memory

1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 11A, the central processing unit 1521 communicates with the main memory 1522 via a system bus 1550. As shown in FIG. 11B, the central processing unit 1521 may also communicate directly with the main memory 1522 via a memory port 1503.

FIG. 11B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 11A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 11B depicts an embodiment of a computer 1500 in which the central processing unit 1521 communicates directly with I/O device 1530e. FIG. 11B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 11A, may control the I/O devices. The I/O controller may control one or more I/O devices such as a keyboard 1530a and a pointing device 1530b, e.g., a mouse or optical pen.

Referring again to FIG. 11A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 11A and FIG. 11B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 11D:
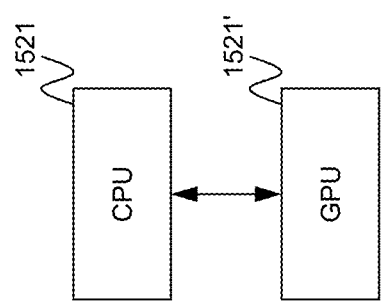
FIG. 11D is a block diagram of a computing device according to an embodiment of the present invention.
Figure 11C:
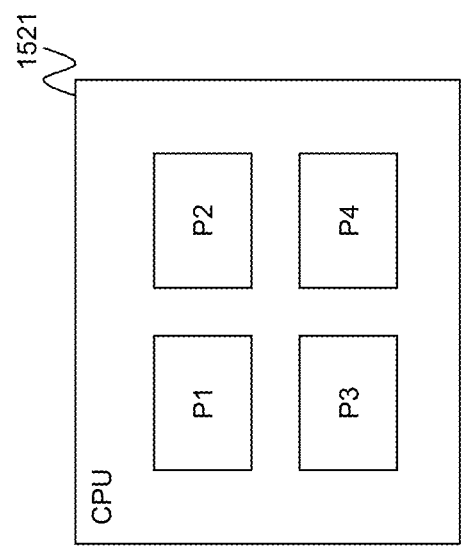
FIG. 11C is a block diagram of a computing device according to an embodiment of the present invention.

As shown in FIG. 11C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 11D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 11E:
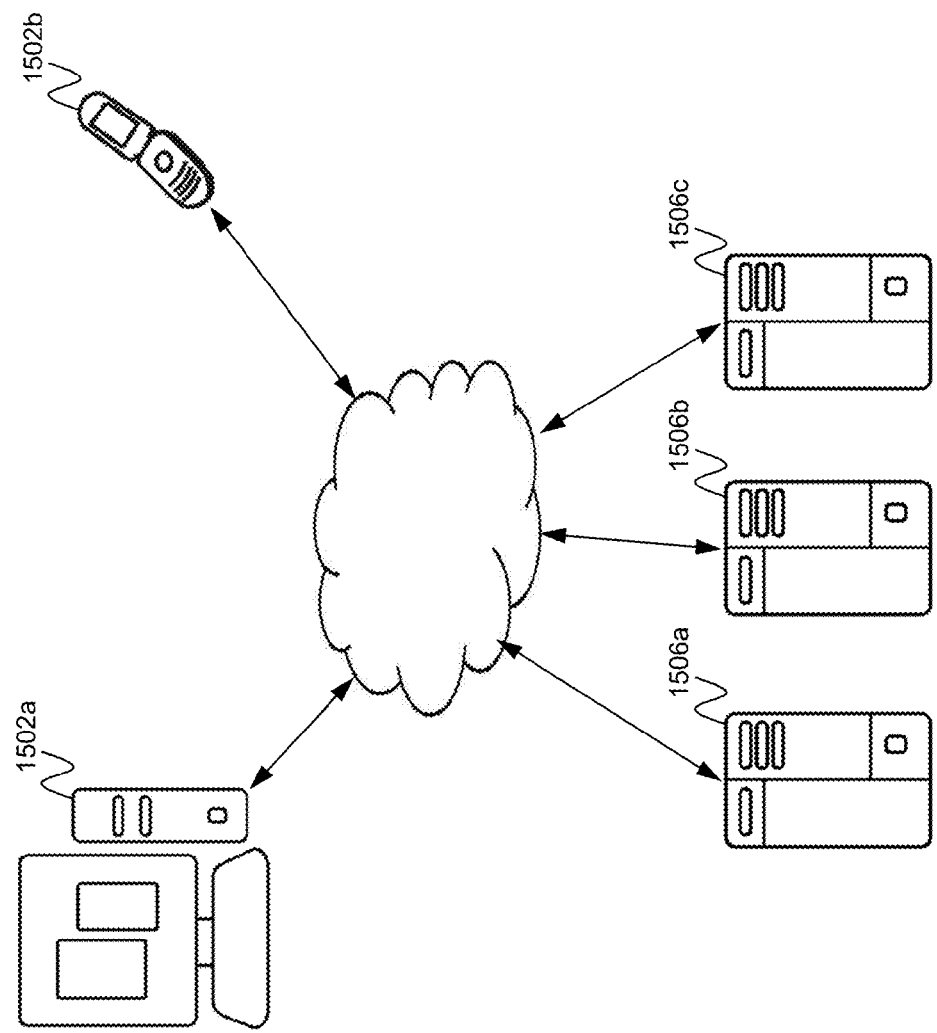
FIG. 11E is a block diagram of a network environment including several computing devices according to an embodiment of the present invention.

A computing device may be one of a plurality of machines connected by a network, or it may comprise a plurality of machines so connected. FIG. 11E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 11E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 11E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

It is the Applicant's intention to cover by claims all such uses of the invention and those changes and modifications which could be made to the embodiments of the invention herein chosen for the purpose of disclosure without departing from the spirit and scope of the invention. The particular manner in which template details are presented to the user may also differ. Thus, the present embodiments of the invention should be considered in all respects as illustrative and not restrictive, the scope of the invention to be indicated by claims and their equivalents rather than the foregoing description.

The invention claimed is:

1. A system for routing one or more tasks associated with a case, the system comprising:
processor;
memory, wherein the memory stores instructions that, when executed by the processor, cause the processor to:
open a case in a customer database, wherein the case is associated with a workflow having steps anticipated to be executed for the case;
identify first and second steps of the workflow, where the second step is anticipated to be executed subsequent to the first step in the workflow;
identify a first agent based on both a skill level of the first agent for handling the first step and a skill level of the first agent for handling the second step;
generate a first task for handling at least the first step of the workflow;
transmit instructions to route the task to the first agent;
generate a second task for handling the second step of the workflow; and
when the first task is completed, transmit instructions to route the second task to the first agent.

2. The system of claim 1, wherein the case is a record including a history of interactions occurring in the case.

3. The system of claim 1, wherein the case is associated with a case ID, and the instructions to route the task include the case ID.

4. The system of claim 3, wherein the instructions further cause the processor to:
retrieve a history of interactions associated with the case based on the case ID; and display, by the processor, the history of interactions on an agent device for the first agent.

5. The system of claim 1, wherein the instructions further cause the processor to:
monitor for a trigger event, wherein the generating of the first task is based on detecting occurrence of the trigger event.

6. The system of claim 5, wherein the trigger event is lapse of a set time period between two workflow steps.

7. The system of claim 5, wherein the trigger event is a preset date.

8. The system of claim 1, wherein the instructions further cause the processor to:
retrieve identification of a first customer segment to which a customer associated with the case belongs, wherein the first customer segment is associated with a first objective of a contact center;
predict an outcome of handling the task by the first agent according to the first customer segment;
identify a second customer segment based on the predicted outcome;
re-associate the customer to the second customer segment, wherein the second customer segment is associated with a second objective of the contact center different from the first objective; and
handle the task according to the second objective instead of the first objective.

9. The system of claim 1, wherein the instructions further cause the processor to:
identify first and second objectives of a contact center, wherein the first objective is identified as more important to the contact center than the second objective;
determine that the first agent has skills for achieving the first objective;
determine a likelihood of success of the first agent in achieving the first objective;
identify a second agent for handling the second objective, wherein the second agent also has skills for handling the first and second steps;
determine a likelihood of success of the second agent in achieving the second objective, wherein the likelihood of success in achieving the second objective by the second agent is higher than the likelihood of success of achieving the first objective by the first agent;
transmit instructions to route the task to the second agent; and
prompt the second agent to pursue the second objective.

10. A non-transitory computer readable medium storing computer code configured to a cause a processor to operate to automatically route one or more tasks associated with a case, the computer code including instructions that configure the processor to:
open a case in a customer database, wherein the case is associated with a workflow having steps anticipated to be executed for the case;
identify first and second steps of the workflow, where the second step is anticipated to be executed subsequent to the first step in the workflow;
identify a first agent based on both a skill level of the first agent for handling the first step and a skill level of the first agent for handling the second step;
generate a first task for handling at least the first step of the workflow;
transmit instructions to route the task to the first agent;
generate a second task for handling the second step of the workflow; and
when the first task is completed, transmit instructions to route the second task to the first agent.

11. The non-transitory computer readable medium of claim 10, wherein the case is a record including a history of interactions occurring in the case.

12. The non-transitory computer readable medium of claim 10, wherein the case is associated with a case ID, and the instructions to route the task include the case ID.

13. The non-transitory computer readable medium of claim 12, wherein the instructions further cause the processor to:
retrieve a history of interactions associated with the case based on the case ID; and
display, by the processor, the history of interactions on an agent device for the first agent.

14. The non-transitory computer readable medium of claim 10, wherein the instructions further cause the processor to:
monitor for a trigger event, wherein the generating of the first task is based on detecting occurrence of the trigger event.

15. The non-transitory computer readable medium of claim 14, wherein the trigger event is lapse of a set time period between two workflow steps.

16. The non-transitory computer readable medium of claim 14, wherein the trigger event is a preset date.

17. The non-transitory computer readable medium of claim 10, wherein the instructions further cause the processor to:
retrieve identification of a first customer segment to which a customer associated with the case belongs, wherein the first customer segment is associated with a first objective of a contact center;
predict an outcome of handling the task by the first agent according to the first customer segment;
identify a second customer segment based on the predicted outcome;
re-associate the customer to the second customer segment, wherein the second customer segment is associated with a second objective of the contact center different from the first objective; and
handle the task according to the second objective instead of the first objective.

18. The non-transitory computer readable medium of claim 10, wherein the instructions further cause the processor to:
identify first and second objectives of a contact center, wherein the first objective is identified as more important to the contact center than the second objective;
determine that the first agent has skills for achieving the first objective;
determine a likelihood of success of the first agent in achieving the first objective;
identify a second agent for handling the second objective, wherein the second agent also has skills for handling the first and second steps;
determine a likelihood of success of the second agent in achieving the second objective, wherein the likelihood of success in achieving the second objective by the second agent is higher than the likelihood of success of achieving the first objective by the first agent;
transmit instructions to route the task to the second agent; and
prompt the second agent to pursue the second objective.

19. A system for executing multiple steps associated with a workflow, the system comprising:
processor;

memory, wherein the memory stores instructions that, when executed by the processor, cause the processor to:
analyze the workflow to identify an immediate next step and at least one related future step and identify a first agent skill set for the immediate next step and a second agent skill set for the future step;
identify an agent having both the first and second skill sets;
generate a first task for handling the immediate next step;
transmit instructions for routing the first task to the identified agent;
generate a second task for handling the future step; and
transmitting instructions to route the second task to the identified agent.

20. The system of claim 19, wherein the instructions that cause the processor to identify an agent having both the first and second skill sets further include instructions that, when executed, cause the processor to:
identify multiple agents with the first and second skill sets;
rank the each of the identified agents based on probability of success of the agent in handling the next step and the future step; and
selecting the agent with the highest rank as the identified agent.

* * * * *